(12) United States Patent
Poese et al.

(10) Patent No.: US 6,792,764 B2
(45) Date of Patent: Sep. 21, 2004

(54) COMPLIANT ENCLOSURE FOR THERMOACOUSTIC DEVICE

(75) Inventors: Matthew E. Poese, State College, PA (US); Robert W. M. Smith, State College, PA (US); Ray S. Wakeland, Muncie, IN (US); Steven L. Garrett, State College, PA (US)

(73) Assignee: The Penn State Research Foundation, University Park, PA (US)

( * ) Notice: Subject to any disclaimer, the term of this patent is extended or adjusted under 35 U.S.C. 154(b) by 0 days.

(21) Appl. No.: 10/409,855

(22) Filed: Apr. 9, 2003

(65) Prior Publication Data

US 2003/0192323 A1 Oct. 16, 2003

Related U.S. Application Data

(60) Provisional application No. 60/372,008, filed on Apr. 10, 2002, provisional application No. 60/371,967, filed on Apr. 10, 2002, and provisional application No. 60/445,866, filed on Feb. 6, 2003.

(51) Int. Cl.$^7$ ................................................. F25B 9/00
(52) U.S. Cl. ............................................................ 62/6
(58) Field of Search ................................................ 62/6

(56) References Cited

U.S. PATENT DOCUMENTS

| | | | |
|---|---|---|---|
| 2,549,464 A | 4/1951 | Hartley | |
| 2,836,033 A | 5/1958 | Marrison | |
| 3,513,659 A | 5/1970 | Martini | 62/6 |

(List continued on next page.)

FOREIGN PATENT DOCUMENTS

| | | |
|---|---|---|
| EP | 0 614 059 | 3/1994 |
| EP | 0 678 715 | 4/1994 |
| GB | 2 237 866 | 5/1991 |
| WO | WO 02/087279 A2 | 10/2002 |

OTHER PUBLICATIONS

S.L. Garrett, "Reinventing the engine," Nature 399, 393–305 (1999).

S. Backhaus and G. Swift, "New varieties of thermoacoustic engines," Proc. 9th Int. Congress on Sound and Vibration (Jul., 2002); Los Alamos National Laboratory Report No. LA–UR–02–2721.

(List continued on next page.)

*Primary Examiner*—Denise L. Esquivel
*Assistant Examiner*—Malik N. Drake
(74) *Attorney, Agent, or Firm*—Gifford, Krass, Groh, Sprinkle, Anderson & Citkowski, PC

(57) ABSTRACT

According to one embodiment of the present invention, a thermoacoustic device has a complaint enclosure which includes a rigid portion and a compliant portion. The compliant portion includes an oscillating member and a flexure seal with a pair of ends and a flexure body extending between the ends. One of the ends is sealed to the rigid portion and the other end is sealed to the oscillating member. The flexure seal has an average cross-sectional area and an end-to-end equilibrium length. A flexure volume is defined as the product of the average cross-sectional area and the end-to-end equilibrium length. A thermal core is disposed in the complaint enclosure and includes at least a first and a second heat exchanger. A working volume of gaseous working fluid fills the complaint enclosure. The working volume of gaseous working fluid has an equilibrium pressure. A motor is operable to oscillate the oscillating member such that the end-to-end length of the flexure seal is increased and decreased with respect to the equilibrium length. Therefore, the pressure of the working volume of gaseous working fluid is oscillated between a peak pressure greater than the equilibrium pressure and a minimum pressure less than the equilibrium pressure. In some embodiments, the working volume is less than or equal to four times the flexure volume, while in other embodiments, the working volume is less than or equal to two times or one times the flexure volume.

37 Claims, 5 Drawing Sheets

U.S. PATENT DOCUMENTS

| | | | |
|---|---|---|---|
| 3,548,589 A | 12/1970 | Cooke-Yarborough | 60/14 |
| 3,604,821 A | 9/1971 | Martini et al. | 417/379 |
| 4,036,018 A | 7/1977 | Beale | |
| RE29,518 E | 1/1978 | Franklin | 60/520 |
| 4,114,380 A | 9/1978 | Ceperley | |
| 4,355,517 A | 10/1982 | Ceperley | |
| 4,398,398 A | 8/1983 | Wheatley et al. | |
| 4,450,685 A | 5/1984 | Corey | 60/520 |
| 4,489,553 A | 12/1984 | Wheatley et al. | |
| 4,490,983 A | 1/1985 | Gifford et al. | |
| 4,599,551 A | 7/1986 | Wheatley et al. | |
| 4,625,517 A | 12/1986 | Miller | |
| 4,686,407 A | 8/1987 | Ceperley | |
| 4,722,201 A | 2/1988 | Hofler et al. | |
| 4,858,441 A | 8/1989 | Wheatley et al. | |
| 4,858,717 A | 8/1989 | Trinh et al. | |
| 4,953,366 A | 9/1990 | Swift et al. | |
| 5,165,243 A | 11/1992 | Bennett | |
| 5,174,130 A | 12/1992 | Lucas | |
| 5,269,147 A | 12/1993 | Ishizaki et al. | |
| 5,295,355 A | 3/1994 | Zhou et al. | |
| 5,303,555 A | 4/1994 | Chrysler et al. | |
| 5,319,938 A | 6/1994 | Lucas | |
| 5,339,640 A | 8/1994 | Reinke | |
| 5,357,757 A | 10/1994 | Lucas | |
| 5,389,844 A | 2/1995 | Yarr et al. | |
| 5,456,082 A | 10/1995 | Keolian et al. | |
| 5,502,968 A | 4/1996 | Beale | |
| 5,515,684 A | 5/1996 | Lucas et al. | |
| 5,519,999 A | 5/1996 | Harpole et al. | |
| 5,579,399 A | 11/1996 | Lucas | |
| 5,647,216 A | 7/1997 | Garrett | |
| 5,673,561 A | 10/1997 | Moss | |
| 5,701,743 A | 12/1997 | Hagiwara et al. | |
| 5,813,234 A | 9/1998 | Wighard | |
| 5,857,340 A | 1/1999 | Garrett | |
| 5,901,556 A | 5/1999 | Hofler | |
| 5,953,920 A | 9/1999 | Swift et al. | |
| 5,953,921 A | 9/1999 | Garrett | |
| 5,996,345 A | 12/1999 | Hofler | |
| 6,032,464 A | 3/2000 | Swift et al. | |
| 6,059,020 A | 5/2000 | Jairazbhoy et al. | |
| 6,079,214 A | 6/2000 | Bishop | |
| 6,145,320 A | 11/2000 | Kim | |
| 6,233,946 B1 | 5/2001 | Masuda | |
| 6,307,287 B1 | 10/2001 | Garrett et al. | |
| 6,314,740 B1 | 11/2001 | De Blok et al. | |
| 6,385,972 B1 | 5/2002 | Fellows | |
| 6,490,881 B1 | 12/2002 | Sinclair et al. | |
| 2001/0025494 A1 | 10/2001 | Okamura et al. | |
| 2002/0166325 A1 | 11/2002 | Corey | |
| 2002/0178736 A1 | 12/2002 | Corey et al. | |

OTHER PUBLICATIONS

S. Backhaus and G. W. Swift, "A thermoacoustic–Stirling heat engine: Detailed stuey," J. Acoust. Soc. Am. 107(6), 3148–3166 (2000).

S. Backhaus and G. W. Swift, "Fabrication and Use of Parallel Plate Regenerators in Thermoacoustic Engines," Laur–1–1393, Los Alamos National Laboratory, IECEC2001–CT–41.

R.S. Wakeland, "Lessons From a Thermoacoustic Refrigeration Demonstration Device," A Thesis in Acoustics, R.S. Wakeland (1999).

G.W. Swift, D.L. Gardner and S. Backhaus, "Acoustic recovery of lost power in pulse tube refrigerators," J. Acoust. Soc. Am. 105(2), 711–724 (1999).

D. L. Gardner and G.W. Swift, "Use of inertance in orifice pulse tube refrigerators," Cryogenics 37(2), 117–121 (1997).

S.L. Garrett, "ThermoAcoustic Life Sciences Refrigerator: A preliminary design study," NASA Technical Report No. LS–10114 (Oct. 30, 1991), L.B. Johnson Space Center, Space and Life Sciences Directorate, Houston, TX; S.L. Garrett, "Thermoacoustic refrigerator," NASA Tech. 21(11), 84–85 (1997).

P.H. Cerperley, "A pistonless Stirling engine—The traveling wave heat engine, " J. Acoust. Soc. Am. 66, 1508–1513 (1979).

D. Gedeon, "DC gas flows in Stirling and pulse–tube cryocoolers," in Cryocoolers 9, R. G. Ross, ed. (Plenum, New York, 1997), pp. 385–392.

R.S. Wakeland, "Use of electrodynamic drivers in thermoacoustic refrigerators," J. Acoustic. Soc. Am. 107(2), 827–832 (2000).

G.W. Swift and W.C. Ward, "Simple harmonic analysis of regenerators," J. Thermophysics and Heat Transfer, 10,652–662 (1996).

S.L. Garrett, D.K. Perkins and A. Gopinath, "Thermoacoustic refrigerator heat exchangers: Design, analysis and fabrication," in G.F. Hewitt, editor, Heat Transfer 1994: Proc. 10th Int. Heat Transfer Conf., pp. 375–380 (Inst. Chem. Eng., Rugby, UK, 1994).

A. Migliori and G. W. Swift, "A liquid–sodium thermoacoustic engine," (preprint version).

G.W. Swift, "Analysis and performance of a large thermoacoustic engine," J. Acoustic. Soc. Am. 92, 1551–1563 (1992).

G.W. Swift, "Thermoacoustic engines and refrigerators," Physics Today 48(7), 22–28 (1995).

G.W. Swift, "Thermoacoustic Engines," Journal of Acoustical Society of America (1988).

S.L. Garrett, J.A. Adeff & T.J. Hofler, "Thermoacoustic refrigerator for space applications," J. Thermophysics and Heat Transfer 7(4), 595–599 (1993).

S. Backhaus and G.W. Swift, "A thermoacoustic–Stirling heat engine," Nature 399, 335–338 (1999).

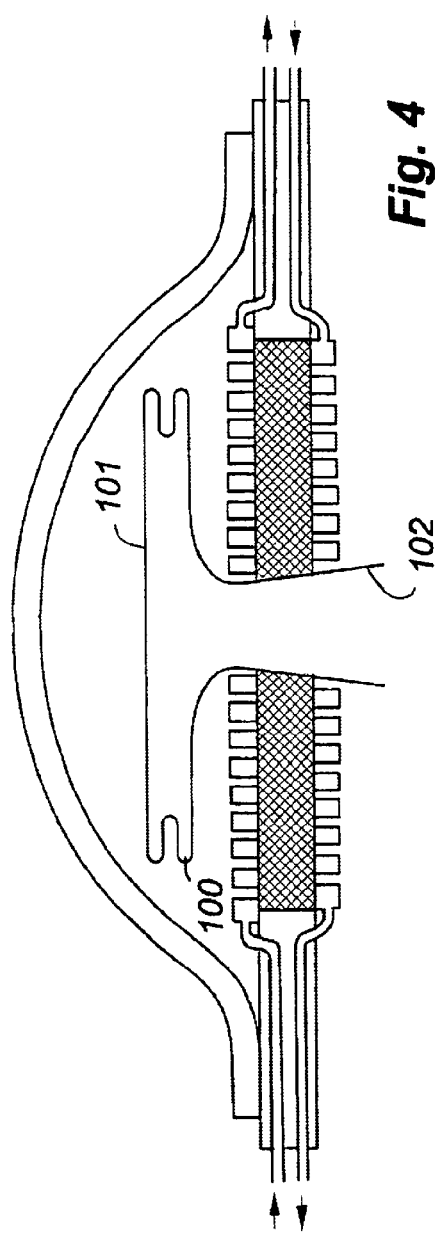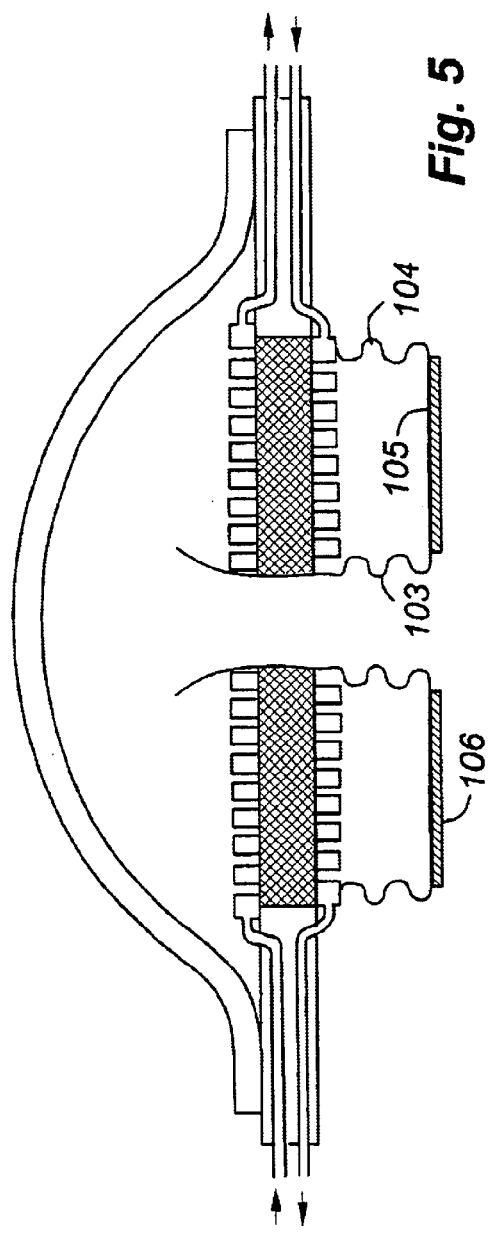

COMPLIANT ENCLOSURE FOR THERMOACOUSTIC DEVICE

REFERENCE TO RELATED APPLICATIONS

This patent application claims benefit from U.S. provisional patent application Serial Nos. 60/372,008, filed Apr. 10, 2002; 60/371,967, filed Apr. 10, 2002; and 60/445,866, filed Feb. 6, 2003, the entire contents of all of which are incorporated herein by reference.

FIELD OF THE INVENTION

The present invention relates generally to thermoacoustic devices and, more specifically, to thermoacoustic engines, heat pumps, and refrigeration devices. However, the present invention has applicability outside the field of thermoacoustics, and is therefore not limited to thermoacoustic devices.

BACKGROUND OF THE INVENTION

During the past two decades, there has been an increasing interest in the development of thermoacoustic cooling engines (pumps) for a variety of commercial, military and industrial applications. Interest in thermoacoustic cooling has accelerated rapidly with the production ban of chlorofluorocarbons (CFC's). Thermoacoustic refrigerators can be constructed such that they use only inert gases, which are non-toxic and do not contribute to ozone depletion, nor to global warming. Exemplary prior art designs for thermoacoustic engines and refrigerators are shown in the following patents: U.S. Pat. Nos. 4,489,553, 4,722,201, 5,303,555, 5,647,216, 5,953,921, 6,032,464, and 6,314,740.

Most of the thermoacoustic engines and refrigerators that consume or produce electrical power require the containment of the thermoacoustic components and the gaseous working fluid within a rigid-walled enclosure (pressure vessel). The pressure vessel is typically either a rigid-walled adiabatic compression volume or a rigid-walled acoustic resonator of either the standing-wave or Helmholtz type. Within these rigid enclosures, oscillatory pressures are produced. If one is building an electrically-driven thermoacoustic refrigerator, there is usually a piston that is actuated by some electro-mechanical transducer (e.g., loudspeaker or other motor mechanism) contained within, or attached to the rigid enclosure. Motion of that piston produces the required pressure oscillations. The piston is coupled to the rigid enclosure, containing the thermoacoustic components, by some means that provides a dynamic pressure seal against leakage of the gaseous working fluid around the piston. In all known cases except one, this dynamic pressure seal is either a clearance seal (e.g., a close-fitting surface that surrounds the piston) or a flexure seal, such as a bellows or diaphragm. The only exception is the Torsionally-Resonant Toroidal Thermoacoustic Refrigerator (T-RTTAR) (see U.S. Pat. No. 5,953,921). The T-RTTAR approach does not employ a dynamic pressure seal, but requires that the entire rigid enclosure be oscillated at the operating frequency.

In a thermoacoustic prime mover (engine), the pressure oscillations are generated thermoacoustically when thermal energy (heat) is supplied to the engine. To extract electrical power from such thermoacoustically-induced pressure oscillations within the rigid enclosure, a piston, which is connected to an electromechanical transducer, is driven by the pressure oscillations. Again, a dynamic pressure seal is required to suppress the flow of the gaseous working fluid around the piston.

Adiabatic Compression Volume

The simplest implementation of a rigid enclosure used to contain the thermoacoustic components and the gaseous working fluid for a thermoacoustic device is one for which each of the rigid enclosure's dimensions is small compared to the acoustic wavelength. An example of such a device is shown in FIG. 1, which is taken from U.S. Pat. No. 6,314,740 to DeBlok (originally FIG. 2). The acoustic wavelength, $\lambda$, is given by the formula $\lambda = a/f$, where the sound speed in the gas or gas mixture within the resonator is a, and piston oscillation frequency is f. One or more pistons, oscillating sinusoidally at frequency f, use electrical power to produce the pressure oscillations or utilize those pressure oscillations to produce electrical power. The relationship between the pressure oscillations and the enclosure volume changes caused by the motion of the piston is controlled by the adiabatic gas law if the smallest dimension of the rigid enclosure, $L_{typ}$ (usually the length or diameter of the rigid enclosure), is small compared to the acoustic wavelength, $L_{typ} \ll \lambda$. For higher power thermoacoustic devices, the wavelength, $\lambda$, is typically on the order of one meter.

Another consideration in the design of thermoacoustic devices is the thermal penetration depth, $\delta_\kappa$, which serves as a characteristic length that describes over what distance heat can diffuse through the working fluid during an acoustic cycle. The rigid enclosure's smallest dimension is always large compared to the thermal penetration depth, $\delta_\kappa$. That is, $L_{typ} \gg \delta_\kappa$. In most thermoacoustic applications, the thermal penetration depth, $\delta\kappa$, is typically on the order of 100 micrometers (100 $\mu$m).

$$\delta_\kappa = \sqrt{\frac{\kappa}{\pi \rho c_p f}} \tag{1}$$

The thermal penetration depth depends upon the density $\rho$, thermal conductivity $\kappa$, and isobaric specific heat $c_p$ of the gaseous working fluid, as well as on the frequency of operation f.

Where the acoustic wavelength is large compared to the rigid enclosure's dimensions, the pressure oscillations everywhere within the enclosure are to a very good approximation constant (i.e. $p_l(t) = p_l \sin(2\pi f t)$ regardless of position), and to the extent that the volume of gas within the enclosure is large compared to the product of the interior surface area and the thermal penetration depth, the pressure oscillations are to a good approximation governed by the adiabatic gas law, $pV^\gamma$=constant. The polytropic coefficient of the gaseous working fluid, $\gamma$, is the ratio of the specific heat of the gas at constant pressure, $c_p$, to the specific heat of the gas at constant volume, $c_v$, $$\gamma = \frac{c_p}{c_v} \tag{2}$$

For small changes in the rigid enclosure volume, $V_o$, that contains the gaseous working fluid at the mean (static) pressure, $p_m$, the magnitude of the oscillatory pressure, $p_l$, can be expressed in terms of the magnitude of the change in the volume of the rigid enclosure, $\delta V$, using the adiabatic gas law.

$$p_1 = \gamma p_m \frac{\delta V}{V_0} \tag{3}$$

The motion of the piston produces the change in the volume of the rigid enclosure. The magnitude of the oscillatory pressure, $p_l$, can be related to the magnitude of the piston motion, $y_o$, using the area of the piston, $A_{pist}$. The time-dependent, sinusoidal displacement of the piston is given by $y_{pist}(t)=y_l\sin(2\pi ft)$, which has a displacement amplitude, $y_l$. The internal volume of the rigid enclosure is $V_o$, if it is measured when the piston is at its neutral or equilibrium position, $y_{pist}=0$. At the neutral piston position the gas pressure within the rigid enclosure is equal to the mean pressure $p_m$, $$p_1 = \frac{\gamma p_m A_{pist}}{V_0} y_1. \tag{4}$$

The above result (Equation 4) demonstrates that for a given volume defined by the rigid enclosure volume, $V_o$, and piston area, $A_{pist}$, the magnitude of the pressure oscillations, $p_l$, is increased as the magnitude of the piston displacement, $y_l$, is increased. To simplify comparison of the performance of an adiabatic compression volume to the performance of a standing-wave resonator, it is convenient to characterize the piston's motion by expressing its motion as producing an oscillatory volume flow rate of amplitude $dV/dt=2\pi f y_l A_{pist}$. The result of (Equation 4) can then be expressed as an acoustic impedance $Z_{ac}=p_l/(dV/dt)$, $$Z_{ac} \equiv \frac{p_1}{(dV/dt)} = \frac{\gamma p_m}{2\pi f V_0}. \tag{5}$$

FIG. 1 illustrates an earlier design that uses this adiabatic compression volume approach. As shown, a piston is joined to a rigid enclosure by a flexible bellows. An electromechanical actuator 2 is attached to the piston-bellows combination 3, which is joined to the rigid enclosure 1 that contains the thermoacoustic elements of this refrigeration system. An acoustic phase control bypass 10 is formed by an internal connection tube 12. A cold heat exchanger is shown at 6, with cold transport fluid inlet 6a and outlet 6b provided for connection to a refrigeration load. A hot heat exchanger is shown at 7, with hot transport fluid inlet 7a and outlet 7b providing a means to exhaust the waste heat that is pumped by the regenerator 8.

For the device of FIG. 1, the volume of the bellows, $V_{bel}$, constitutes a very small fraction of the total volume, $V_o$, of the rigid enclosure that contains the gaseous working fluid and the thermoacoustic components. Since the motion of the bellows, and hence the motion of the piston, $y_l$, is limited by displacement and pressure induced stresses in the bellows material (typically metal), the pressure oscillation magnitude, $p_l$, given by Equation 4, will be smaller than desirable for high cooling power density in the refrigeration application contemplated by the inventor.

Bellows Excursion (Stroke) Limitations

The limitations placed on pressure oscillation magnitude by the design of the device of FIG. 1 are not unique to that design. Instead, this is a serious problem faced by a range of thermoacoustic devices. Additionally, the bellows themselves place certain limitations on devices which make use of them. The useful lifetime of a bellows (number of cycles-to-failure, $N_{max}$) is determined by the magnitude of the combined static and dynamic stresses produced in the bellows material due to the bellows excursions in compression and extension and the pressure differential across the bellows. The sum of these excursion and pressure induced stresses must be compared to the endurance limit (the maximum material stress allowable for an infinite number of cycles-to-failure $N_{max}=\infty$) of the bellows material. Expressions for calculation of these stresses and the expected number of cycles-to-failure for bellows are provided in the *Standards of the Expansion Joint Manufacturer's Association, Inc.*, 25 North Broadway, Tarrytown, N.Y. 10591 (EJMA Standards).

The EJMA Standards also provide expressions for calculation of the frequencies, $f_{bel}$, for the compressional standing-wave resonance of a bellows of a given length, $L_{bel}$. It has been shown by R. W. M. Smith [*High Efficiency Two Kilowatt Acoustic Source for a Thermoacoustic Refrigerator*, Penn State Applied Research Laboratory Technical Report No. TR 01-001 (November 2000), pages 43–45] that for dynamic flexure of bellows at frequencies greater than about $f_{bel}/20$, the EJMA Standards have to be supplemented by a dynamic stress concentration factor.

To appreciate the limitation imposed by the change in volume, $\delta V$, dictated by the bellows excursion amplitude restrictions discussed above, it is useful to partition the enclosure volume, $V_o$, into a static portion defined by the rigid enclosure, $V_{enc}$, and the volume of the bellows, $V_{bel}$. Therefore, $V_o=V_{enc}+V_{bel}$. The restrictions on volume change, $\delta V$, for a bellows imposed by the EJMA Standards and Smith's dynamic stress concentration factor tends to limit volume change, $\delta V$, to about 10% of the bellows volume, $V_{bel}$, so that $\delta V \leq 0.10 V_{bel}$. Equivalently, for a rigid enclosure and bellows of constant cross-sectional area, $y_l/L_{bel} \leq 10\%$. Inspection of FIG. 1 suggests that for De Blok's configuration, the bellows volume is less than 20% of the total volume, $V_{bel}<0.20 V_o$. Consequently, in the De Blok configuration, $\delta V/V_o<0.02$. This small compression ratio, $\delta V/V_o$, suggests that the peak-to-mean pressure ratio, $p_l/p_m=\gamma\delta V/V_o$, for such a device is also on the order of only a few percent ($\leq 3\%$).

Most thermoacoustic devices require that the peak-to-mean pressure ratio, $p_l/p_m$ be greater than 3% to be of practical value. Peak-to-mean pressure ratios in the range of $5\%<p_l/p_m<10\%$ have most commonly been used to date to produce the optimum ratio of cooling power volumetric density (for a thermoacoustic refrigerator) to non-linear dissipation produced by high gaseous working fluid flows, although higher pressure amplitudes are expected to be attractive, when such losses can be reduced. For thermoacoustic prime movers (engines), the preferred peak-to-mean pressure ratios, $p_l/p_m$, have tended to even larger values than those consider by most designers to be optimal for refrigeration applications.

The small compression ratios characteristic of the De Blok configuration in FIG. 1 can be overcome by using a thermoacoustic engine to produce the oscillatory pressure required by the thermoacoustic refrigerator [see, for example, U.S. Pat. Nos. 4,858,441; 5,901,556; 6,032,464 or Reh-lin Chen, "Design, construction and measurement of a large solar powered thermoacoustic cooler," Penn State (December 2001)] if the refrigeration application is better suited being driven by thermal, rather than electrical power. However, many applications are better suited to the use of electrical power.

Clearance Seal Limitations

The limitations of the small compression ratio of the bellows can also be overcome if a clearance seal is used instead of a bellows (flexure) seal to suppress flow of the gaseous working fluid around the piston. Use of the clearance seal approach introduces additional power dissipation due to fluid friction in the small gap between the piston and the bore, as well as "blow-by" losses due to gas flow through the gap. Use of the clearance seal approach also produces de-centering of the piston's motion (known as "piston walking") that will move the equilibrium position of the piston and linear motor. This piston walking is due to the build-up of a static pressure differential which can be produced by the asymmetry of the pressure in the compression and expansion strokes or the synchronous "gap wobble" of the piston within its bore [see G. W. Swift, *Thermoacoustics: A unifying perspective for some engines and refrigerators* (Acoustical Society of America, 2002)]. That differential pressure has to be relieved with a relief valve or other means, such as an acoustical bypass network as taught by W. C. Ward, J. C. Corey, and G. W. Swift, [see "Drift stabilizer for reciprocating free-piston devices," filed April 2001, Los Alamos National Laboratory, Case S-94,784].

Acoustic Resonator

Most of the thermoacoustic engines and refrigerators that produce (for engines) or consume (for refrigerators and heat pumps) electrical power make use of the placement of the thermoacoustic components, and the gaseous working fluid, within a rigid-walled enclosure that operates as a standing-wave or Helmholtz (lumped parameter) acoustical resonator. For the purposes of this discussion, both the "standing-wave" and the "Helmholtz" resonators are considered to be rigid-walled enclosures that use the inertial and elastic properties of the gaseous working fluid to create an acoustical resonance within the enclosure. Acoustical resonance of the gaseous working fluid enhances the amplitude of the pressure oscillations for a given piston motion (typically characterized by the volume velocity, dV/dt, induced by the piston's oscillations) over the amplitude of an adiabatic compression volume by a factor of $Q/\pi$, if the volume of the two rigid enclosures are equal. This may produce a desirable effect, since increased pressure amplitude or reduced piston motion generally improve performance (power density) and/or increase reliability.

The use of a cavity that is an acoustic resonator provides a means of increasing the pressure oscillations of the gaseous working fluid over the pressure oscillations that would be possible for the same amplitude of the piston motion at some frequency that is not a resonance of the rigid cavity (see S. Garrett and S. Backhaus, "The Power of Sound," *American Scientist Magazine* 88(6), 516–525 (2000)]. This resonant pressure enhancement will be dependent upon the geometrical shape of the resonator. If we consider a standing-wave resonator that is operated in a mode that contains one half-wavelength, $\lambda/2$, in the longer dimension, and has a quality factor Q, then the acoustic impedance, $Z_{ac}$, of the resonator is given [see I. Rudnick, *Journal of the Acoustical Society of America* 63(6), 1923–1925 (1978)] by, $$Z_{ac} \equiv \frac{p_1}{(dV/dt)} = \frac{\gamma p_m Q}{\pi f V_0} \quad (6)$$

Comparison of the result for the acoustical impedance, $Z_{ac}$, of the half-wavelength, $\lambda/2$, standing-wave resonator (Equation 6), with the impedance of the adiabatic compression volume (Equation 5), shows that for rigid enclosures of the same volume, $V_o$, the standing-wave resonator produces Q/2 times greater pressure, $p_1$, for the same oscillatory piston volume flow rate, dV/dt. This oscillating pressure enhancement can be substantial, since thermoacoustic resonators typically have a large quality factor, such as $Q \cong 20 \pm 10$. As taught by Wakeland [see *J. Acoust. Soc. Am.* 107(2), 827–832 (2000)], limitations imposed by the stroke of the linear motor and the mechanical impedance that produces the maximum electro-acoustic energy conversion efficiency for that motor, may not make the acoustic resonant Q-enhancement of Equation 6 useful unless there is sufficient latitude in the choice of piston area, $A_{pist}$, for a given application and choice of linear motor.

The oscillatory pressure increase created by the acoustical resonator, as well as the increased surface area of such a resonator compared to an equivalent adiabatic compression volume, can also introduce additional dissipation. This resonator dissipation is due primarily to the high velocities of the gaseous working fluid near the center of a standing-wave resonator or in the neck of a Helmholtz resonator at high amplitudes and due to thermoviscous boundary layer losses at lower amplitudes. Rigid enclosures that function as acoustical resonators also tend to be significantly longer than adiabatic compression volumes for containment of thermoacoustic components rated for the same cooling or power generation capacities.

In light of the above, there is a need for improved thermoacoustic devices, which overcome the shortcomings of the prior art.

SUMMARY OF THE INVENTION

The present invention provides a compact, high power density geometry for the exploitation of thermoacoustic heat transport in refrigeration and engine applications. By placing the thermoacoustic components (e.g., stack or regenerator, heat exchangers, and/or acoustical phasing components) within a compliant enclosure, it is possible to retain all of the well-known attractive features of the imoacoustic devices while producing a complete refrigerator or engine that is more compact and more energy efficient than possible with previous designs. Attachment of the compliant enclosure to a linear motor (loudspeaker) or linear alternator (electrical generator) permits the efficient production of useful cooling from electrical power, or efficient conversion of input heat (that produces thermoacoustically-induced pressure oscillations) to either electrical power [see U.S. Pat. No. 5,996,345] or to thermoacoustic cooling [see U.S. Pat. Nos. 4,858,441; and 5,901,556].

According to one embodiment of the present invention, a thermoacoustic device has a complaint enclosure which includes a rigid portion and a compliant portion. The compliant portion includes an oscillating member and a flexure seal with a pair of ends and a flexure body extending between the ends. One of the ends is sealed to the rigid portion and the other end is sealed to the oscillating member. The flexure seal has an average cross-sectional area and an end-to-end equilibrium length. A flexure volume is defined as the product of the average cross-sectional area and the end-to-end equilibrium length. A thermal core is disposed in the complaint enclosure and includes at least a first and a second heat exchanger. A working volume of gaseous working fluid fills the complaint enclosure. The working volume of gaseous working fluid has an equilibrium pressure. A motor is operable to sinusoidally oscillate the oscillating member such that the end-to-end length of the flexure seal is sinusoidally increased and decreased with respect to the equilibrium length. Therefore, the pressure of the working volume of gaseous working fluid is sinusoidally oscillated between a peak pressure greater than the equilibrium pressure and a minimum pressure less than the equilibrium pressure. In some embodiments, the working volume is less than or equal to four times the flexure volume, while in other embodiments, the working volume is less than or equal to two times or one times the flexure volume. In another embodiment, at least a portion of the thermal core is disposed in the flexure volume. A pressure amplitude may be defined as half of the difference between the peak pressure and the minimum pressure in the working volume. In several embodiments, the pressure amplitude is greater than or equal to five percent of the mean pressure, while in other embodiments, the pressure amplitude is greater than or equal to 10 percent or 15 percent of the mean pressure.

According to another aspect of the present invention, a thermoacoustic device is provided with a pressure vessel having an interior volume sealed therein. A compliant enclosure is disposed in the interior volume of the pressure vessel. The compliant enclosure includes a rigid portion and a compliant portion. The compliant portion includes an oscillating member with a mass, $m_{osc}$, and an area, $A_{osc}$, and a flexure seal with a pair of ends and a flexure body extending therebetween. One of the ends is sealed to the rigid portion and the other end is sealed to the oscillating member. The flexure seal has an average cross-sectional area and an end-to-end equilibrium length. A flexure volume, $V_{flex}$, is defined as the product of the average cross-sectional area and the end-to-end length. A thermal core is disposed in the compliant enclosure and includes at least a first and a second heat exchanger. A pressurized gaseous working fluid fills the compliant enclosure and the pressure vessel. The gaseous working fluid has a polytropic coefficient, $\gamma$, and an equilibrium pressure, $p_m$. A working volume, $V_o$, is defined as the volume of working fluid in the compliant enclosure. A motor is operable to sinusoidally oscillate the oscillating member at an operating frequency, f, such that the end-to-end length of the flexure seal is sinusoidally increased and decreased with respect to the equilibrium length. The motor has a moving portion interconnected with the oscillating member, with the moving portion having a mass, $m_{motor}$. A pressure vessel volume, $V_{motor}$, is defined as the volume of gaseous working fluid in the interior volume of the pressure vessel and exterior to the compliant enclosure and not displaced by the motor. The oscillatory motion of the oscillating member is resisted by a spring force, k, equal to the sum of a mechanical stiffness, $k_{mech}$, resultant from the flexure seal and a gas stiffness, $k_{gas}$, resultant from the gaseous working fluid. The gas stiffness is defined as:

$$k_{gas} = \frac{\gamma p_m A_{osc}^2}{V_{eff}} = \gamma p_m A_{osc}^2 \left[ \frac{1}{V_0} + \frac{1}{V_{motor}} \right]$$

An optimal operating frequency, $f_{opt}$, is defined as:

$$f_{opt} = \frac{1}{2\pi} \sqrt{\frac{k_{total}}{m_{total}}} = \frac{1}{2\pi} \sqrt{\frac{k_{gas} + k_{mech}}{m_{osc} + m_{motor} + m_{eff}}}$$

wherein $m_{eff}$ is the effective mass of the moving portion of the flexure seal. The operating frequency, f, is preferably in the range of $0.8*f_{opt}$ to $1.2*f_{opt}$, but may be in the range of $0.9*f_{opt}$ to $1.1*f_{opt}$, or substantially equal to $f_{opt}$.

In yet another embodiment of the present invention, a thermoacoustic device includes a pressure vessel with an interior volume sealed therein. The pressure vessel has a perimeter side wall. A piston is disposed in the interior volume of the pressure vessel. The piston has a perimeter seal that slidably engages the side wall so as to define a working volume, $V_o$, on one side of the piston and a motor volume, $V_{motor}$, on the opposite side of the piston. The piston has a mass, $m_{osc}$, and an area, $A_{osc}$. A thermal core is disposed in the working volume, and includes at least a first and a second heat exchanger. A pressurized gaseous working fluid fills the working volume and the motor volume. The gaseous working fluid has a polytropic coefficient, $\gamma$, and an equilibrium pressure, $p_m$. A motor is disposed in the motor volume and is operable to sinusoidally oscillate the oscillating member at an operating frequency, f, such that the pressure of the gaseous working fluid in the working volume sinusoidally oscillates between a peak pressure greater than the equilibrium pressure and a minimum pressure less than the equilibrium pressure. The motor has a moving portion interconnected with the piston. The moving portion having a mass, $m_{motor}$. The oscillatory motion of the oscillating member is resisted by a spring force, k, equal to a gas stiffness, $k_{gas}$, resultant from the gaseous working fluid. The gas stiffness is defined as:

$$k_{gas} = \frac{\gamma p_m A_{osc}^2}{V_{eff}} = \gamma p_m A_{osc}^2 \left[ \frac{1}{V_0} + \frac{1}{V_{motor}} \right]$$

An optimal operating frequency, $f_{opt}$, being defined as:

$$f_{opt} = \frac{1}{2\pi} \sqrt{\frac{k_{total}}{m_{total}}} = \frac{1}{2\pi} \sqrt{\frac{k_{gas}}{m_{osc} + m_{motor}}}$$

The operating frequency, f, being in the range of $0.8*f_{opt}$ to $1.2*f_{opt}$, and may be in the range of $0.9*f_{opt}$ to $1.1*f_{opt}$, or substantially equal to $f_{opt}$.

BRIEF DESCRIPTION OF THE FIGURES

FIG. 4 is a cross-sectional view of an alternative flow suppression bellows design;

FIG. 5 is a cross-sectional view of another alternative flow suppression bellows design.

DETAILED DESCRIPTION OF THE INVENTION

The present invention provides a thermoacoustic device with a compliant enclosure that contains the gaseous working fluid and the thermoacoustic components. In one embodiment, a bellows or other flexible structure that provides a dynamic gas seal defines substantially the entire sidewall of the compliant enclosure. In this approach, the volume of the gaseous working fluid contained within the compliant enclosure, $V_o$, may be close to, approximately the same as, or less than the volume of the bellows, $V_{bel}$. In some embodiments, the bellows is assumed to be a thin-walled cylindrical-shaped shell that has convolutions in some portion of its walls. The outer radius of the convolutions is $r_{out}$ and the inner radius is $r_{in}$. The equilibrium length of the bellows is $L_{bel}$. The bellows volume $V_{bel}$ is then taken to be the product of the mean cross-sectional area of the bellows, $A_{bel} = \pi((r_{in}+r_{out})/2)^2$, and the bellows length $L_{bel}$, so that $V_{bel} = A_{bel} L_{bel}$. In one preferred embodiment, $V_o$, may be less than $V_{bel}$, due to the exclusion of some of the enclosure volume from the intrusion of the piston into the bellows volume $V_{bel}$, the volume displaced by the thermoacoustic components that are within the bellows, and the intentional inclusion of rigid (but not necessarily solid) bodies placed within the bellows volume specifically to reduce the effective enclosure volume $V_o$.

For purposes of illustration, one embodiment may be assumed to have a compliant enclosure with an effective volume that is 15% less than the volume of the bellows, $V_o=0.85V_{bel}$. If again it is assumed that $\delta V=0.10\ V_{bel}$, for the reasons described earlier, then the magnitude of the compression ratio becomes $\delta V/V_o=0.10V_{bel}/0.85V_{bel} \approx 12\%$. Assuming that an inert gas with polytropic coefficient $\gamma=5/3$ is used for the working fluid, then Equation 4 suggests that the compliant cavity could produce a maximum ratio of peak-to-mean pressure, $p_l/p_m$, of nearly 20 percent, while still maintaining a bellows excursion within the range required for infinite bellows lifetime ($N_{max}=\infty$). Such a pressure ratio is more than adequate for any contemplated thermoacoustic refrigeration or prime mover (engine) application.

First Preferred Embodiment

Figure 2:
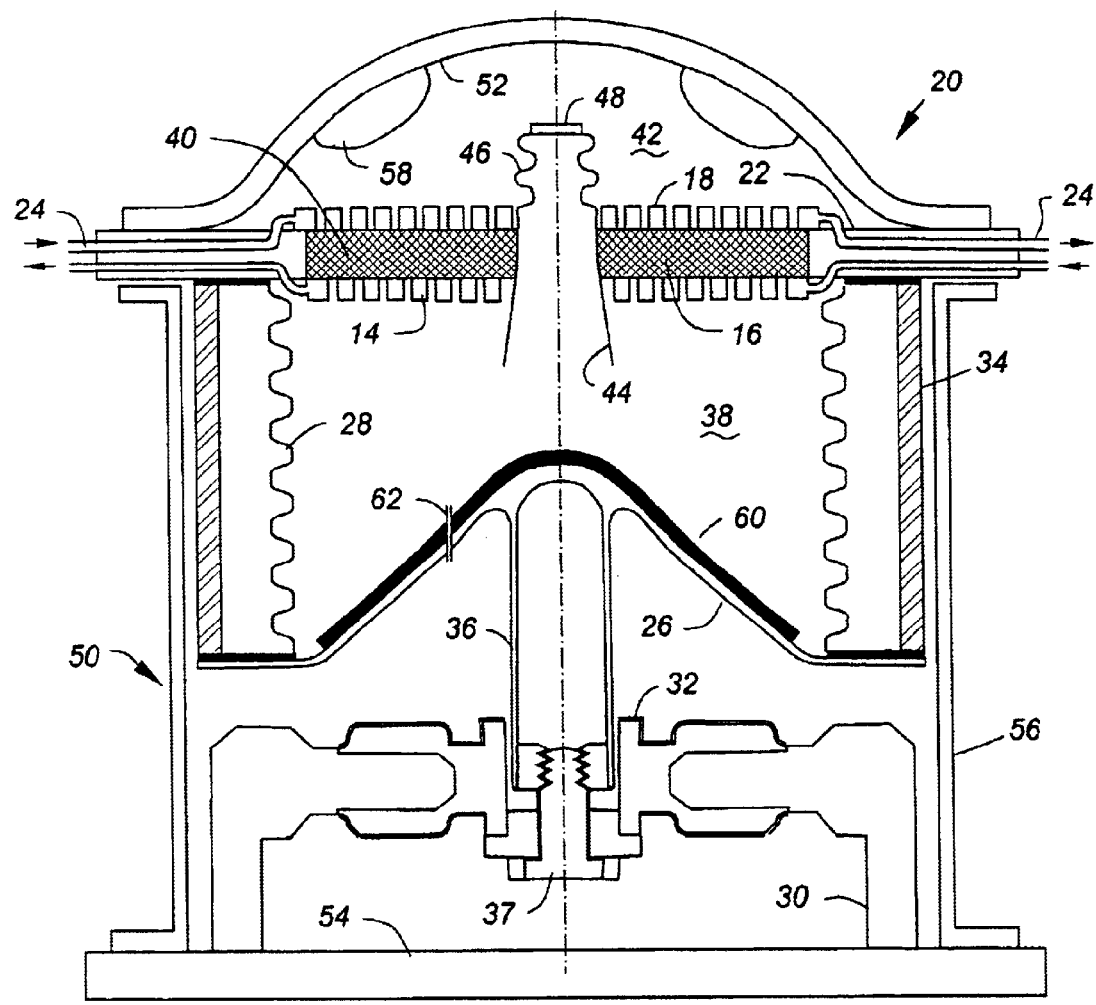
FIG. 2 is a cross-sectional front view of a first embodiment of a thermoacoustic device according to the present invention.

A first preferred embodiment of a thermoacoustic refrigerator utilizing a compliant enclosure, according to the present invention, is shown at 20 in FIG. 2. The thermoacoustic refrigerator 20 includes an outer pressure vessel 50 containing substantially all of the components of the refrigerator, including a compliant enclosure. The compliant enclosure, in turn, houses the thermal components 40. These thermal components 40 include a cold heat exchanger 14, a regenerator 16, and a hot heat exchanger 18. These components 40 are supported by a thermally insulating plate 22 that accommodates the passage of heat exchanged fluids through tubes 24, which communicate with thermal sinks or loads outside the pressure vessel 50. A piston 26 is shown below the thermal components 14–18, with a bellows 28 extending between and interconnecting the piston 26 and the thermally insulated plate 22. A linear motor or actuator 30 is interconnected with the piston 26 by a moving portion 32 of the motor 30. Therefore, the motor 30 is operable to move the piston. In the illustrated embodiment, the moving portion 32 of the motor 30 is interconnected with the piston 26 by a rigid tube 36. A cylindrical spring 34 may be provided between the piston 26 and some stationary portion of the device, such as the insulating plate 22, to adjust the mechanical resonance frequency of the system.

As will be clear to those of skill in the art, the bellows 28 and piston 26 cooperate to define a contained volume. The pressure in this contained volume will rise as the piston 26 moves upwardly and will fall as the piston 26 moves downwardly. The working volume (or volume of gaseous working fluid) includes a bellows volume 38, minus the volume occupied by the thermal components 40, plus any additional volume 42 outside the bellows, minus any other displaced volume. The bellows volume is defined as the volume between the ends of the bellows 28, and enclosed by the bellows. Therefore, the bellows volume is equal to the product of the average cross-sectional area of the bellows and the length of the bellows. The thermal component volume 40 is defined as the volume displaced by the thermal components, which would otherwise be occupied by the working fluid. For example, the heat exchangers 14 and 18 and the regenerator 16 each displace some volume of the working fluid. The volume displaced by the thermally insulating plate 22 should also be considered part of the thermal component volume 40, for purposes of calculating the working volume of the device. The additional volume 42, for this embodiment, is defined as the volume above the upper end of the bellows and below the upper end of the pressure vessel 50, which is defined by an end cap 52. In this embodiment, the thermal components displace a portion of what would otherwise be the bellows volume and a portion of what would otherwise be the additional volume. Looked at another way, a portion of the thermal components, specifically the cold heat exchanger 14, extends downwardly past the upper end of the bellows 28 and into the bellows volume.

As also shown in FIG. 2, the device 20 has a thermal buffer tube 44 which extends through the thermally insulating plate 22 and the other thermal components 14–18. A flow suppression bellows 46 is connected to the upper end of the tube 44, with the upper end of the bellows 46 being closed off with an end having added mass 48. These additional items 44–48 may also be considered part of the thermal components. Like the other thermal components, the parts 44–48 displace some of the working fluid volume.

Volume exclusion bodies 58 may be provided in various positions, such as attached to the end cap 52, so as to further reduce the working volume of the device, and thus increase the pressure ratio, for a given amount of piston motion Similarly, volume exclusion bodies may be provided inside the bellows volume 38 to increase the compression ratio. The volume displaced by the exclusion bodies 58 must also be subtracted from the working volume. For calculating the working volume, the additional volume 42 may be calculated while taking into consideration the volume displaced by the exclusion bodies, or the volume displaced by exclusion bodies may be separately subtracted. In the illustrated embodiment, the piston 26 is cone-shaped, and therefore extends into the area that would otherwise be bellows volume. Therefore, the additional volume displaced by the cone-shaped piston, as compared with a flat piston, must also be subtracted from the total of the bellows volume and the additional volume. As will be clear to those of skill in the art, because the additional volume 42 is small, some volume is displaced by the thermal components 40 and the exclusion bodies 58, and the piston 26 extends upwardly significantly into the bellows volume 38, the actual working volume, or volume of gaseous working fluid, may be less than the bellows volume, which is the product of the cross-sectional area of the bellows and the end-to-end length at equilibrium. Preferably, the working volume is less than or equal to the bellows volume, though in some embodiments the working volume may be greater than the bellows volume. For example, the working volume may be less than or equal to 2 times, 3 times, or even 4 times the bellows volume. In other embodiments, the working volume is equal to or less than 0.9 times the bellows volume, or 0.85 times the bellows volume.

The piston 26 may be covered by a thin, lightweight thermally insulating material 60 and may be penetrated by a narrow static pressure equilibrium capillary 62. Any volume displaced by the thermally insulating material at 60 is also displaced from the working volume in the compliant enclosure. It should be noted that position information such as above and below are exemplary only, and are not limiting on the configuration of devices utilizing the present invention. Likewise, the present invention is not limited to the configurations illustrated in the various figures. Instead, the orientations and configurations may be altered without departing from the scope of the invention.

A more detailed description of the various components of the first embodiment of the present invention will now be provided.

Pressure Vessel

In the first preferred embodiment, all of the essential thermoacoustical components are contained within the pressure vessel 50 (comprised of a hemi-elliptical end cap 52, a base plate 54, and a cylinder 56). The purpose of pressure vessel 50 is to contain the pressurized gaseous working fluid that is pressurized to a working pressure, $p_m$. Typically, the working pressure, $P_m$, is substantially above atmospheric pressure. In FIG. 2, the three components 52–56 of the pressure vessel 50 are joined together by bolts and sealed with o-rings that are not shown. In a production unit, the pressure vessel 50 may be joined and sealed by welding. By containing the pressurized gaseous working fluid within the pressure vessel 50, the only pressures that have to be resisted by the bellows 26 are the differential pressures developed across the bellows, not the entire static pressure, $p_m$. An alternative embodiment is described in a subsequent section that does not require use of a pressure vessel, but requires that the entire (static and dynamic) pressure be contained by the bellows.

Thermal Components

In this embodiment, all of the thermal components or thermal core (the cold heat exchanger 14, the regenerator 16, the hot heat exchanger 18, the flow suppression bellows 46 with the added mass 48, and the thermal buffer tube 44) are attached to the thermally insulating plate 22 to facilitate fabrication and assembly. The sizes of cold heat exchanger 14, regenerator 16, and hot heat exchanger 18 are determined by the required cooling power and temperature span dictated by the particular application. Heat transport fluids pass through the hot heat exchanger 18 to exhaust heat outside the device and through cold heat exchanger 14 to provide useful cooling to the designated thermal load. Alternatively, heat may be provided to the device if it is to be used as a thermoacoustic engine. Each of the devices described herein are generally reversible and may be used as an engine rather than a pump. Also, as will be clear to those of skill in the art, the term "thermoacoustic refrigerator" or "pump" or "engine" may be used interchangeably herein without limiting the applicability of the present invention. Additionally, the present invention may be used with thermal storage elements other than a regenerator, such as a stack. A thermal storage element may also be dispensed with, in accordance with the disclosure of U.S. provisional patent application Serial No. 60/381,735, filed May 16, 2002, the entire contents of which is incorporated herein by reference.

Suppression of Gedeon Streaming

As taught by David Gedeon ["DC gas flows in Stirling and pulse-tube cryocoolers," in *Cryocoolers* 9, R. G. Ross, ed. (Plenum, N.Y., 1997), pages 385–392] and by Swift, et al. [U.S. Pat. No. 6,032.464], the passage of acoustic power through a regenerator creates a time-independent pressure difference across the regenerator. Unless a barrier to that flow is provided, or a pressure difference of equal magnitude and opposite sign is generated by some other means, that time-independent pressure difference will generate unidirectional flow of the gaseous working fluid through the heat exchangers 14 and 18 and regenerator 16. This acoustically-driven unidirectional gas flow (known as Gedeon Streaming) may introduce a detrimental heat load that will degrade refrigeration performance unless suppressed. In the exemplary embodiments shown in FIGS. 2 and 3, the flow is suppressed with a flow suppression bellows 46 that may be loaded with an added mass 48. (An alternative flow-suppression bellows configuration is shown in FIG. 4.) The optional added mass 48 insures that the flow suppression bellows 46 is operating in a stiffness controlled mode at the device driving frequency, f. As will be clear to those of skill in the art, other approaches to suppression of Gedeon Streaming may also be used.

Acoustical Phasing Network

To provide the proper phasing between oscillating pressure of amplitude $p_l$, within the regenerator 16 and gas flow through the regenerator, the gas must act like a mass. The inertance of the gas in the thermal buffer tube 44 combines with the compliance of the gas between the flow suppression bellows 46 and hemi-elliptical end cap 52 to provide the proper phasing of pressure and gas flow in the regenerator 16. Operation of the flow suppression bellows 46 with the added mass 48 in the mass-controlled frequency regime guarantees that the flow suppression bellows with the added mass will also behave like an inertance at the operating frequency, f.

The additional inertance provided by the flow suppression bellows 46 with the added mass 48 enhances the pressure/gas flow phasing by reducing the required oscillatory gas flow. The higher total inertance (gas inertance plus bellows inertance) allows smaller network volume compliance and hence less oscillatory gas flow to provide the same enhancement to the oscillating pressure in the space between the hot heat exchanger 18 and the hemi-elliptical end cap 52. Reduction of oscillatory gas flow through the acoustical phasing network also reduces parasitic losses produced by turbulence generated at changes (and particularly discontinuities) in the cross-sectional area of the oscillatory fluid flow path.

Thermal buffer tube 44 reduces the heat leak from the gas adjacent to the hot heat exchanger 18 to the cold heat exchanger 14. These components might also be configured to provide a time-independent pressure differential to suppress Gedeon Streaming using the asymmetry in the minor loss coefficients between in-flow and out-flow as taught by Swift, et al. [U.S. Pat. No. 6,032,464].

Figure 1:
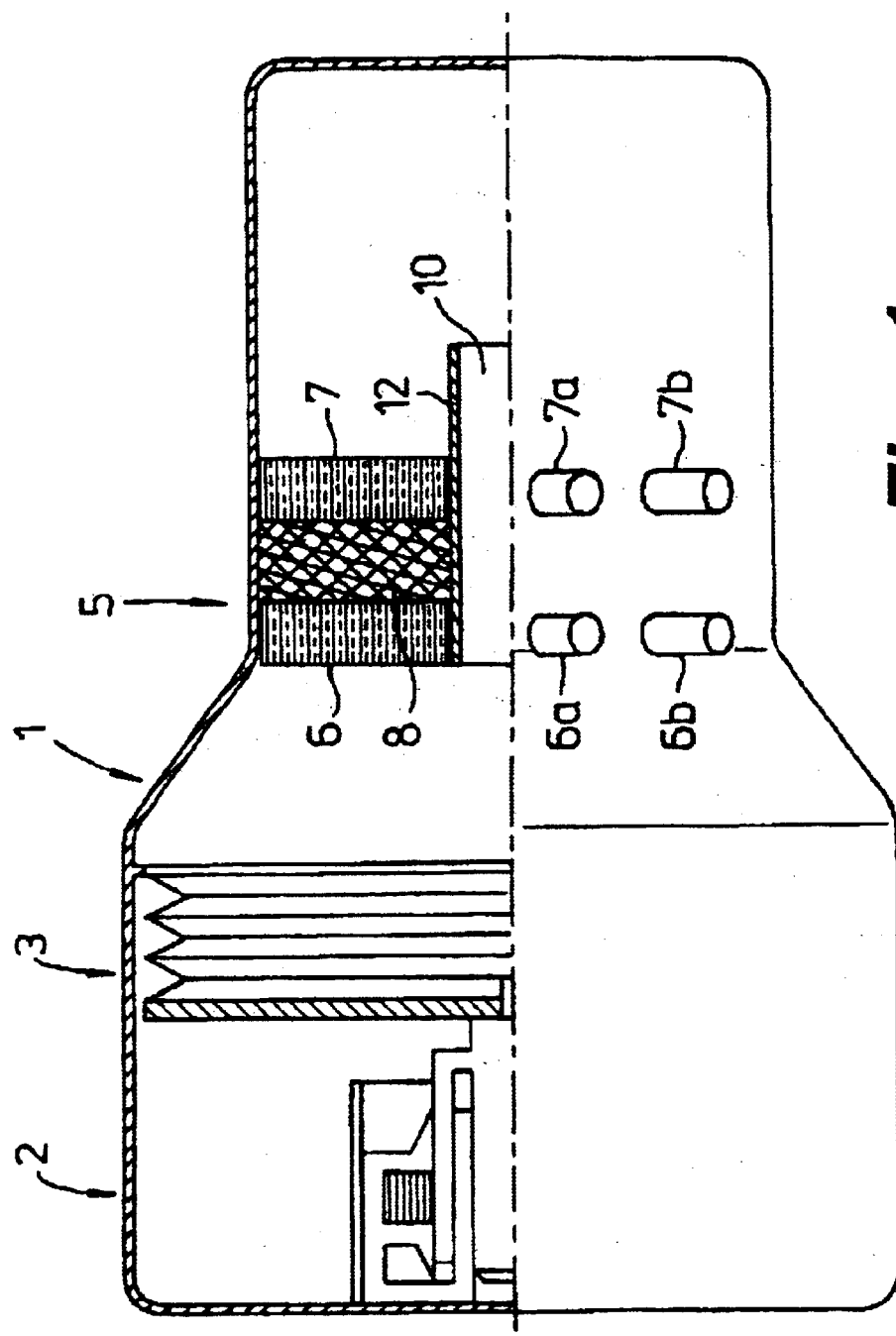
FIG. 1 is a cross-sectional view of a prior art thermoacoustic device.
Figure 6:
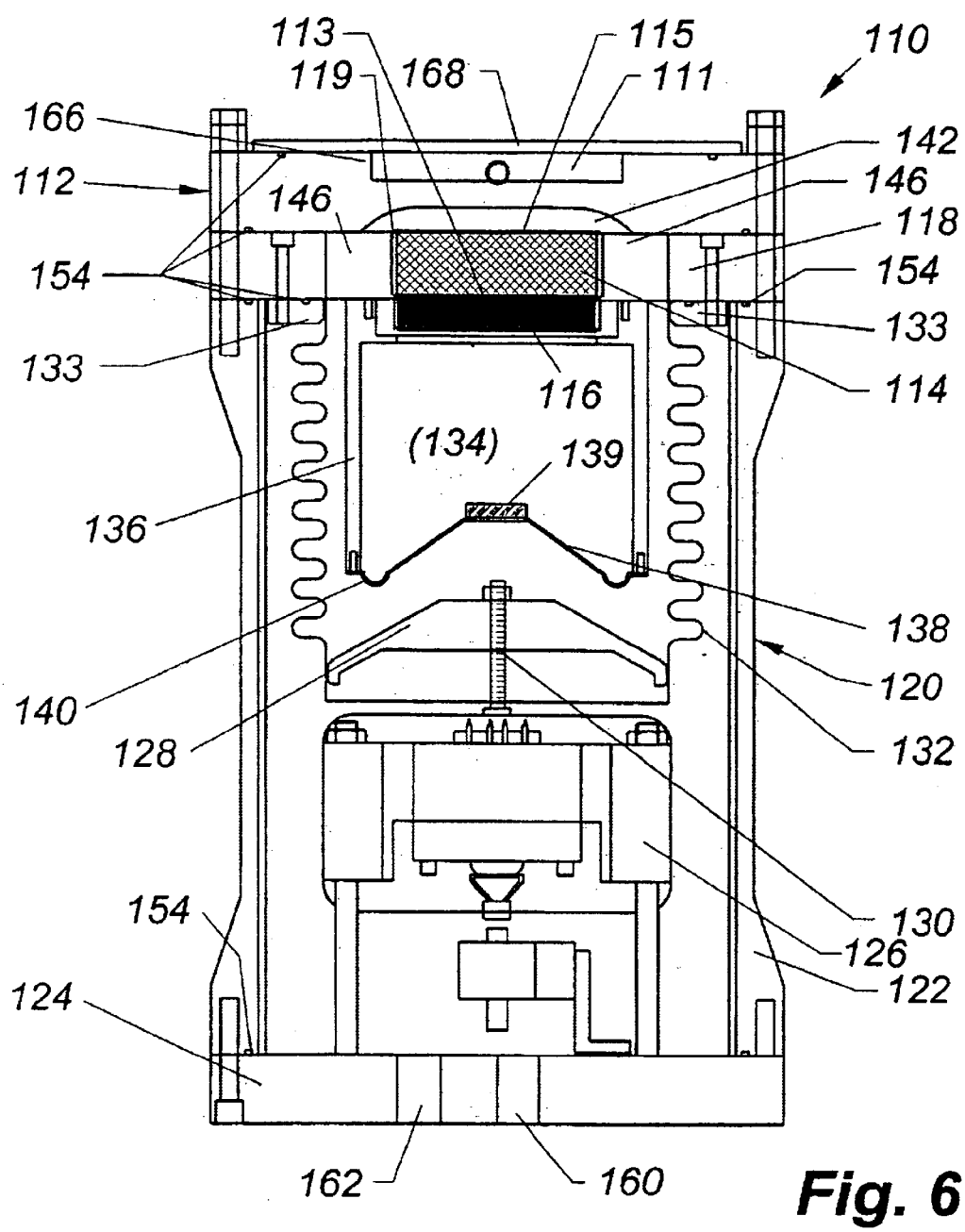
FIG. 6 is a cross-sectional front view of a third alternative embodiment of a thermoacoustic device according to the present invention.

As will be clear to those of skill in the art, other means for adjusting the acoustical phase may be employed. FIG. 1 illustrates one approach, and FIG. 6 illustrates another approach. Additional approaches will be clear to those of skill in the art. In each case, the acoustic phasing means preferably causes the gas pressure and gas velocity oscillations in the regenerator to be generally in-phase with one another.

Conical Piston

The required pressure oscillation of magnitude $p_l$ is produced by adiabatic compression of the gaseous working fluid contained within the bellows 28 by the motion of the rigid conical piston 26 joined to the bellows 28 and to the moving portion 32 of motor the 30. The intrusion of rigid conical piston 26 into the volume, $V_{bel}$, defined by bellows 28, increases the achievable compression ratio without shortening the bellows length, $L_{bel}$, as discussed earlier. The conical shape adds rigidity to the piston. The moving portion 32 of the motor 30 is joined to the rigid conical piston 26 by a rigid tube 36. The rigid conical piston 26 is joined to the rigid tube 36 and the moving portion 32 of the motor 30 by tensioning bolt 37. A thin thermally insulating material 60 may be joined to the piston 26 by an adhesive layer to reduce heat leaks from the room temperature region occupied by the motor 30 to the cold gas adjacent to the cold heat exchanger 14. The stationary portion of the motor 30 is rigidly attached to the base plate 54.

In this embodiment, a small diameter pressure equilibration tube 62 penetrates the rigid conical piston 26 and the thermally insulating material 60. The purpose of the equilibration tube 62 is to equilibrate the static pressure within the bellows 28 and the region of the pressure vessel 50 occupied by the motor 30. The diameter and length of the equilibration tube 26 is chosen so the exponential pressure equilibration time constant is much longer (by about a factor of one hundred) than the period of oscillation, 1/f, of the rigid conical piston 26.

While the piston 26 is illustrated as being conical in this embodiment, alternative shapes may also be used. For example, the piston may be flat such that it does not displace any of the bellows volume. However, in accordance with the present invention, it is generally preferred that the working volume of the thermoacoustic device be reduced somewhat so as to increase the pressure fluctuations in the compliant enclosure. Therefore, a piston that extends somewhat into the bellows volume is preferred. Other shapes with cross-sections of isosceles trapezoids or hemi-ellipses, for example, would maintain rigidity and low mass while excluding some of the volume of the bellows and thereby increasing the compression ratio $\delta V/V_{bel}$ or $\delta V/V_o$. Also, the term "piston" is used herein to refer to any oscillating member, and may be more generically referred to by the term "oscillating member." The pistons or oscillating members may also have shapes other than round, especially in applications where the thermoacoustic device or bellows have a non-circular cross-section.

Volume Exclusion Bodies

Rigid bodies 58 can be attached to any stationary component, such as hemi-elliptical end cap 52 or thermally insulating plate 22, to change the compliance of the acoustical feedback network or to reduce the effective compression volume, $V_o$, and increase the compression ratio, $\delta V/V_o$. To effectively exclude volume, the bodies need only to be rigid, but not necessarily solid. In FIG. 2, the rigid body 58 reduces the volume of the gas contained between the hemi-elliptical end cap 52 and the hot heat exchanger 18. Inclusion of a rigid body in the volume bounded by the bellows 28, the rigid conical piston 26, and the upper end of the bellows (the bellows volume 38) will decrease the adiabatic compression volume, $V_o$, and increase the compression ratio, $\delta V/V_o$, if the oscillatory displacement of the rigid conical piston 26 is held constant.

Resonant Components

The moving massive or inertial portions of the motor and piston combine with the stiffness of the gaseous working fluid contained within the bellows 28, and the stiffness of an optional mechanical stiffness elements, shown in FIG. 2 as cylindrical spring 34, to form an acousto-mechanical resonator. The mechanical resonance produced by the interaction of the inertia of the moving mass of the motor and piston with the stiffness of the gas contained within the bellows 28, and other elastic elements (e.g., bellows material elastic stiffness, auxiliary mechanical spring stiffness, and motor magnetic stiffness), permit larger piston excursions due to the elastic and kinetic energy storage of the resonance. The "bouncing" of the piston mass off of the gas stiffness is responsible for the term "bellows bounce," as used herein to describe one aspect of the present invention.

The majority of the oscillating pressure production used to induce the thermoacoustic effects is provided by reactive kinetic and potential energy exchange. Only the power consumed by the refrigeration effect and the parasitic effects (e.g., heat exchanger losses, thermoviscous boundary layer loss, turbulent flow loss, mechanical resistance of the motor, etc.) has to be replaced by the action of the motor. Similarly, in prime mover (thermoacoustic engine) applications, only the energy converted to electricity by the linear alternator has to be supplied by the thermoacoustic conversion of heat to mechanical (pressure) energy once energy has been supplied to overcome parasitic losses.

Optimal production of the oscillatory pressure of amplitude $p_I$ at maximum electroacoustic efficiency requires that the piston/stiffness system operate at a frequency, f, that is equal to the mechanical resonance frequency, $f_o$, determined below in Equation 7.

$$f_o = \frac{1}{2\pi}\sqrt{\frac{k_{total}}{m_{total}}} = \frac{1}{2\pi}\sqrt{\frac{k_{gas} + k_{mech}}{m_{pist} + m_{motor} + m_{eff}}} \quad (7)$$

The total stiffness of the combined system, $k_{total}$, will be the sum of the stiffness provided by the gas, $k_{gas}$, contained in the compliant enclosure (also referred to as the working volume), and the gas contained in the motor space outside the bellows, plus the total mechanical stiffness, $k_{mech}$, comprised of the mechanical stiffness of bellows, $k_{bel}$, plus the mechanical stiffness, $k_{spring}$, of any auxiliary spring. As known to those of skill in the art, the mechanical stiffness of the bellows may approach zero under certain operating conditions. Those of skill in the art will also appreciate several approaches for determining $k_{mech}$. The auxiliary spring may be the cylindrical spring 34, which is concentric with the bellows 28, or a flat spring attached to the motor or piston, as taught by U.S. Pat. No. 6,307,287, the entire contents of which is incorporated herein by reference. Alternatively, the designer may choose to use a cylindrical spring of a diameter that is less than the diameter of the bellows 28, by placing a cylindrical spring within the bellows 28, instead of outside the bellows 28 as shown in FIG. 2.

For the configuration shown in FIG. 2, the gas stiffness is given by Equation 8.

$$k_{gas} = \frac{\gamma p_m A_{pist}^2}{V_{eff}} = \gamma p_m A_{pist}^2 \left[\frac{1}{V_o} + \frac{1}{V_{motor}}\right] \quad (8)$$

Gas stiffness is provided by both the gas contained within the compliant enclosure, $V_o$, and the gas in the motor volume, $V_{motor}$, defined by the gas exterior to the compliant enclosure and within cylindrical pressure vessel 50, excluding the volume occupied by the stationary motor parts 30, moving motor part 32, rigid tube 36, tensioning bolt 37, and cylindrical spring 34. The total moving mass, $m_{total}$, includes the moving mass of the motor, $m_{motor}$, comprised of the moving part 32, plus the mass of the piston, $m_{pist}$, comprised of the mass of the rigid tube 36, the mass of the rigid conical piston 26, and the mass of the tensioning bolt 37, plus the effective moving mass, $m_{eff}$, that includes a fraction (typically between ½ and ⅓) of the mass of the bellows 28 and cylindrical spring 34.

As will be clear to those of skill in the art, equations 7 and 8 may be made more general such that the bounce aspects of the present invention may be used with a thermoacoustic device having a piston with a clearance seal. In this case, there is no $k_{mech}$ or $m_{eff}$ due to a bellows, though there may be a contribution from a spring, if used. Also, equation 8 must be modified such that a working volume is defined as the volume above the piston. Assuming the motor is contained in a sealed volume below the piston, the motor volume is the volume surrounding the motor.

In accordance with one aspect of the present invention, the thermoacoustic device 20 is designed such that the gas stiffness and mechanical stiffness combine and provide a restoring force at the operating frequency that exactly balances the force of the oscillating mass of the device. By exchanging a large fraction of the mechanical energy of motion of the rigid conical piston and other oscillatory mass between kinetic and potential forms, large compression ratios $\delta V/V_o$ can be achieved without requiring that the motor provide all of the required force for compression and expansion on each cycle. This acousto-mechanical resonance ("bellows bounce") feature recovers some of the advantages of using an acoustic (standing-wave or Helmholtz) resonator while reducing overall device size and eliminating some of the energy dissipation mechanisms associated with the thermoviscous losses and large amplitude of motion experienced by the gaseous working fluid in the high-velocity regions of the standing-wave resonator or the neck of the Helmholtz resonator.

By increasing the magnitude of the realizable dynamic pressure amplitude $p_1$ over earlier configurations, while maintaining the compactness of the adiabatic compression approach, the "bellows bounce" thermoacoustic design produces a substantial increase in the volumetric power density (e.g., cooling power per cubic centimeter of complete device volume).

Linear Motor

As discussed previously, for electrically driven applications, a linear motor is the preferred choice to oscillate the piston in the various embodiments of the present invention. Several reasons encourage this choice.

First, as shown earlier, and in documents referenced herein, the operating frequency of the bellows has an important impact on the operating stresses, and thus on the extent of the piston motion which can be permitted for continuous operation, and the latter directly impacts the accessible pressure ratio. To optimize a bellows to obtain the highest possible axial displacement for a given volume, operation at a fixed operating frequency is required. While conversion of rotary motion into reciprocating motion is routinely performed with a cam or other mechanical devices, in general a rotary motor cannot instantaneously achieve a particular angular rotation rate, so that the bellows may be subjected to a range of frequencies in reaching the final operating point, which are all potentially sub-optimal for the bellows.

A second feature, which favors linear motors, is that proportional control of a thermoacoustic device of the sort contemplated in the exemplary embodiments can be achieved by varying the amplitude of the piston (without variation of the frequency). An ordinary cam or eccentric drive would not permit variation of the piston amplitude. Again, it is possible to produce a mechanical mechanism which can both convert rotary motion to reciprocating motion, and provide a means to vary the amplitude at a fixed rotation rate, but such a mechanism is clearly more complex.

Further, it is widely recognized that the efficiency, excursion, and power density of electrodynamic linear motors is significantly greater at higher powers ($\geq 100$ W) if the magnet oscillates and the coil is stationary [see R. S. Wakeland, *J. Acoust. Soc. Am.* 107(2), 827–832 (2000), Table I.] Because the mass of the moving magnet structure can be greater than the mass of moving coils (voice coils) used in conventional electrodynamic loudspeakers, it may be necessary to provide substantial stiffness to resonate the larger magnet moving mass at frequencies of interest in thermoacoustic devices. The large gas stiffness provided by the gaseous working fluid contained within the compliant cavity (and also outside the bellows if a pressure containment vessel is employed as shown in the First Exemplary Embodiment of FIG. 2) provides all, or at least a substantial part, of the stiffness required to resonate the mass of the moving magnet structure, as well as the moving mass of the other parts of the electroacoustic transduction system (e.g., piston, connection tube, etc).

Compatibility with moving-magnet linear motors is also considered to be advantageous, since it has been shown [see R. W. M. Smith, *High Efficiency Two Kilowatt Acoustic Source for a Thermoacoustic Refrigerator,* Penn State Applied Research Laboratory Technical Report No. TR 01-001 (November 2000)] that the electromechanical conversion efficiency of moving-magnet linear motors increases as the power demand from the motor decreases. This increase in efficiency is opposite of that observed for conventional rotary motors [see E. A. Avallone and T. Baumeister III, *Mark's Standard Handbook for Mechanical Engineers,* $10^{th}$ ed. (M$^c$Graw-Hill, 1996); Table 15.1.13]. The increase in efficiency of moving-magnet linear motors is particularly attractive if a proportional control scheme is used to control the temperature of the refrigerated space by continuously varying the power demanded from the motor. Therefore, it is preferred that a linear motor is used with the present invention. However, other devices, such as rotary motors, may be used. As used herein, "motor" refers to any device operable to oscillate the oscillating member.

Instead of the rigid connection of motor 30 to base plate 58, a resilient motor mount could be substituted to produce a two-degree-of-freedom system. Motor 30 can thus move with a phase that is opposite to motor moving part 32. Such an arrangement could reduce transmission of vibration to other parts of the structure containing the thermoacoustic engine or refrigerator.

Dynamic Bellows Length Restrictions

Since the bellows compression ratio, $\delta V/V_{bel}$, that will accommodate an infinite lifetime ($N_{max}=\infty$) is so important to the operation of the above-discussed configuration, it is worthwhile to review some of the basic restrictions placed on this ratio by the mechanics of a bellows subject to internal (material) stresses induced by the combined effects of displacement in the axial direction and pressure differential across the bellows. A metal bellows has advantages over a piston with a clearance seal since it does not permit blow-by and the energy dissipated by mechanical losses produced by the metal's flexure is negligibly small.

The bellows design is limited by the fact that the bellows material must be quite thin, typically on the order of 1/100 inch (250 micrometers) thick, if it is to be capable of an infinite number of excursion that are on the order of ±10% of its convolved length [for further details, see *Standards of the Expansion Joint Manufacturer's Association, Inc.,* 25 North Broadway, Tarrytown, N.Y. 10591]. Since the walls of the bellows must be thin (to reduce deflection stresses), and it is typically designed to operate with $L_{bel}=\delta/4$, the metal of the bellows does not provide the significant elastic stiffness necessary to resonate the moving mass of the electromechanical transducer. In some cases, it also may not be capable of sustaining the large pressure differentials (that produce pressure stresses in the bellows) that would allow it to produce the stiffness required for it to function as a gas spring. In those cases, an alternative cylindrical spring with an integral dynamic gas seal is recommended as an alternative to the bellows. A design for a cylindrical spring with an integral dynamic gas seal is disclosed in Provisional Patent Application Serial No. 60/371,967 and in a co-pending U.S. patent application Ser. No. 10/409,760 filed Apr. 9, 2003, entitled "Cylindrical Spring with Integral Dynamic Gas Seal," the entire contents of both of which are incorporated herein in their entirety by reference.

In the design of a bellows for the present application, care must be taken to choose a bellows shape and size to provide both the necessary oscillatory pressure amplitude, $p_1$, gas spring stiffness, $k_{gas}$, and the required excursion amplitude. Choice of a conventional metal bellows, the alternative in the incorporated disclosures, or other approaches will depend upon the specifics of the intended application. It should be noted that a bellows and a cylindrical spring with an integral dynamic gas seal both fall within the definition of a flexure seal, as used herein, as do devices such as described in U.S. Pat. Nos. 6,461,695; 6,237,922; 5,236,204, and others. Other bellows designs, and any equivalents known to those of skill in the art also fall within this definition. For the purposes of the present invention, a flexure seal is defined as a member that is at least partially flexible and substantially blocks (seals) the passage of a gas such as used as a working fluid in a thermoacoustic device. Such devices include many tube like conveyances with substantial compliance along the axis of motion, which provide a boundary over which a pressure difference can be maintained and which are intended in operation to undergo axial compression, as a desired part of their function. The term "flexure seal" as used herein refers to seals in which the material is flexed in any way, and is not limited to devices in which the material just bends. A flexure seal for use with the present invention will typically be generally cylindrical, though they may have sides that are non-straight or non-parallel, such as a truncated cone, and may also be other shapes. They will typically have a pair of ends, one of which is closed off by an oscillating member such as a piston, while the other end is closed off by some portion of the remainder of the thermoacoustic device. A flexure seal will surround a volume and, when its ends are closed off, will enclose a bellows volume or flexure volume. In the case of a bellows such as in FIG. 2, the flexure seal may be said to have a pair ends with a piston closing off one end. The other end lies generally in a plane, with the bellows volume or flexure volume being defined as the volume inside the bellows and between the planes containing the ends of the bellows.

The guidance provided by the Standards of the Expansion Joint Manufacturers' Association (EJMA Standards) applies primarily to quasi-static deflections. Those standards suggest that increasing the bellows length, $L_{bel}$, can reduce bellows stresses. That strategy is limited by "buckling" and "squirm," as described in the EJMA Standards, for quasi-static deflections. For the higher frequency operation suited to thermoacoustic devices, the effects of exciting compressional waves on the bellows must also be considered.

The stiffness, $k_{tot}$, and inertia (mass), m, of the material that is used to produce a conventional bellows leads to a fairly slow compressional wave speed, $c_{comp}$, that was derived in terms of those two parameters by R. W. M. Smith [see *High Efficiency Two Kilowatt Acoustic Source for a Thermoacoustic Refrigerator*, Penn State Applied Research Laboratory Technical Report No. TR 01-001 (November, 2000), pages 43–45]

$$c_{comp} = L_{ac}\sqrt{\frac{k_{tot}}{m}} \tag{9}$$

The mass of the bellows of active length $L_{ac}<L_{bel}$ is based on the density of the bellows material, $\rho$. Smith has shown that the optimal operating frequency corresponds to a quarter-wavelength fitting within the active length of the bellows, $L_{ac}=\lambda/4=c_{comp}/4f_{opt}$. This optimal operating frequency provides a high operating frequency that results in a dynamic stress increase of $\pi/2$ greater than the stress for quasi-static deflection of the same compression (or expansion) amplitude.

For a bellows of fixed length and given amplitude of compression (or expansion), the stress in the bellows is uniform along the axial direction, if the frequency of deflection (compression and expansion) is much less than $f_{opt}$. This low frequency stress is called the quasi-static stress limit that is assumed by the EJMA Standard. If the deflection frequency is much greater than $f_{opt}$, then compressional waves will travel along the bellows in the axial direction and be reflected at its ends. These compressional waves will produce very high stress concentrations at various locations along the bellows while reducing the overall effective volume change, $\delta V$, since different portions of the bellows will be in compression and extension at the same instant. If the bellows is deflected at a frequency that is twice $f_{opt}$, or higher integer multiples of $f_{opt}$, then there will be half-wavelength compressional standing wave resonances on the bellows. These resonances will greatly enhance the stresses at the compressional wave displacement nodes and at both end of the bellows, but will produce no net compression or expansion hence $\delta V \cong 0$, even though one end of the bellows is in motion. Operation at any one of these compressional wave resonance frequencies can induce fatigue failure, since the bellows compressional wave resonances are very weakly damped.

Exemplary Dimensions and Specifications.

While those of skill in the art will appreciate that a thermoacoustic device according to the present invention may take a wide variety of forms of shapes, a variety of dimensions and specifications for one working example of a thermoacoustic device as pictured in FIG. 2 is given herein. In one working example of the thermoacoustic device 20, the pressure vessel includes an outer cylinder 56 with an inside diameter of approximately 8.5 inches, and a height of approximately 14 inches. The thermally insulating plate 22 has a thickness of approximately 1.2 inches while the endcap 52 is hemi-elliptical, as shown, with a volume of approximately 0.75 liters. The bellows 28 has an equilibrium length (length with the piston at the mid-point of travel) of approximately 7.1 inches, an inside diameter of 6 inches, and an outside diameter of 7.2 inches. The bellows is constructed of Inconel™ alloy 625 with a wall thickness of 0.016 inches, and includes a total of 8-shaped convolutions in the sidewall. As shown, the conically-shaped piston extends upwardly above a theoretical plane which would close off the lower end of the bellows. The piston displaces approximately 0.25 liters of volume that would otherwise be enclosed by the bellows, if the piston was instead flat. The hot and cold heat exchangers are parallel plate-style heat exchangers. The regenerator 16 is a stack of stainless steel screens. The thermal buffer tube 44 has a top-to-bottom height of approximately 3 inches, and an interior diameter of approximately 1 inch, with the lower ends being flared slightly outwardly, as shown. The flow suppression bellows has a height of approximately 1.5 inches and a diameter of approximately 1.2 inches, and the added mass, if used, may weigh approximately 10 gm. Together, the thermal components, including the hot and cold heat exchangers 14 and 18, the regenerator 16, the thermal buffer tube 44, the flow suppression bellows 46, and the added mass 48, along with the thermally insulating plate 22 displace approximately 0.75 liters volume. Based upon the above-provided information, the device 20 has a bellows volume of 4 liters, a thermal component volume of 0.75 liters, an additional volume of 0.75 liters, and other displaced volume of 0.25 liters. Therefore, the working volume is 3.75 liters, volume exclusion bodies are attached to the endcap 52, and displace a total of 0.25 liters of volume. In this exemplary device, the inside of the pressure vessel 50 is filled with Helium gas at a pressure of approximately 1 Mpa (145 psi). The operating frequency is approximately 100 Hz, while the cylindrical spring 34 has a stiffness of approximately 300 kN/m.

Second Preferred Embodiment

It is possible to dispense with the pressure vessel 50 shown in FIG. 2, and allow the bellows to contain both the static pressure, $p_m$, and the dynamic pressure oscillations of amplitude $p_1$. If the bellows contains the total pressure, the equilibrium position of the rigid conical piston will change as the interior of the bellows is pressurized. This static pressure induced bellows displacement will produce static stresses in the bellows as well as static stresses in any auxiliary stiffness component, such as the cylindrical spring. The equilibrium position of the motor moving part will also change within the magnetic circuit of the fixed portions of motor.

Figure 3:
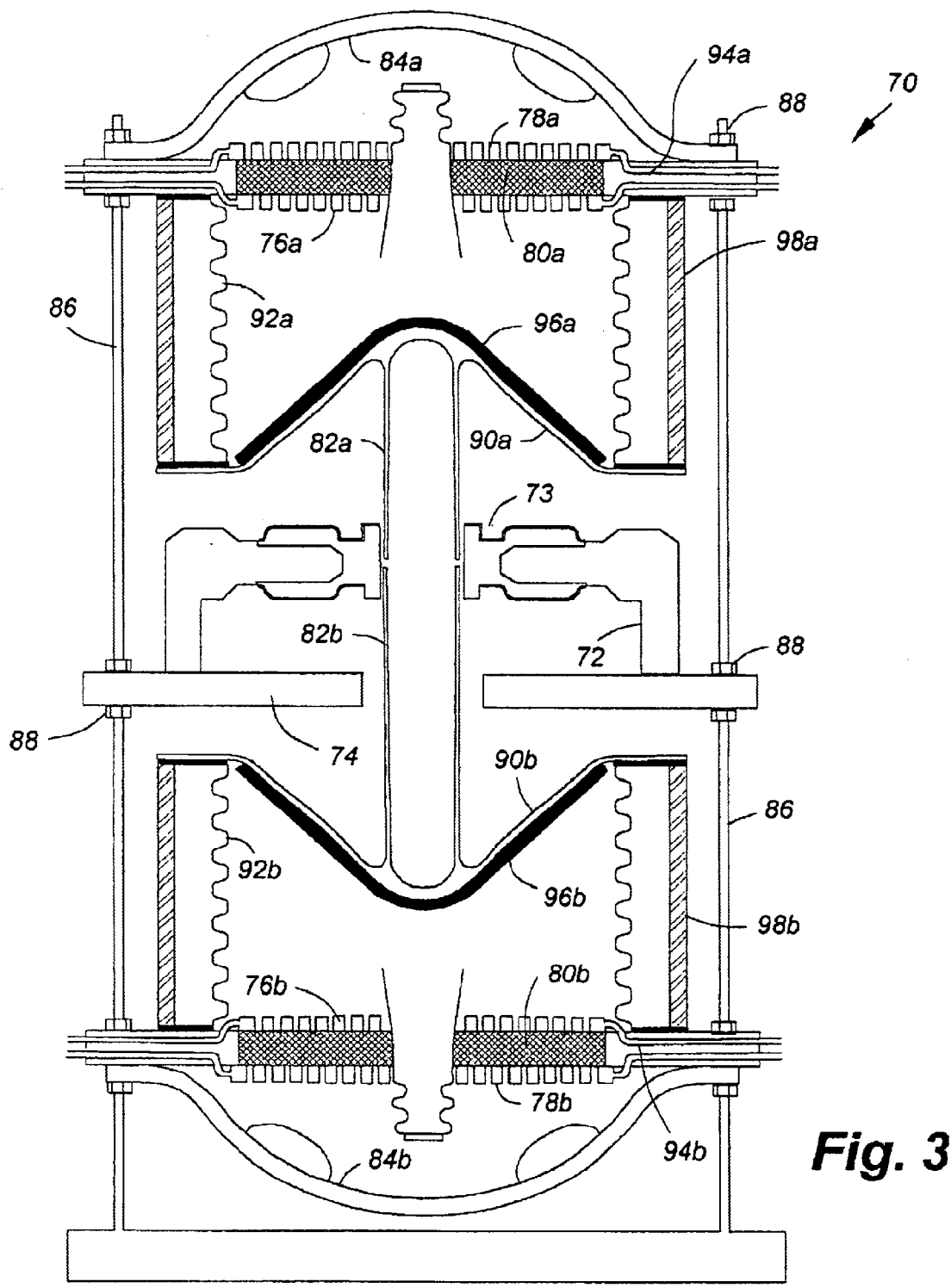
FIG. 3 is a cross-sectional front view of a second embodiment of a thermoacoustic device according to the present invention.

A second exemplary embodiment of a thermoacoustic refrigerator according to the present invention is shown in FIG. 3. FIG. 3 illustrates a double-ended thermoacoustic refrigerator 70 including a motor 72 supported by a central support plate 74. Each of the components described in FIG. 2 is provided above the support plate 74, and duplicated below the support plate 74, with the exception of the side wall of the pressure vessel. This embodiment avoids the static pressure induced bias while eliminating the need for a separate pressure vessel to contain the static pressure. The need for a pressure equilibration capillary is also eliminated. An additional advantage of the embodiment shown in FIG. 3 is that a single motor is used to produce dynamic pressure oscillations $p_1$, in two sets of thermoacoustic cores, comprised of cold heat exchangers 76a and 76b, hot heat exchangers 78a and 78b, and regenerators 80a and 80b. Of course, this dual thermal core, twin bellows approach can also be used if a pressure vessel is also employed.

To accommodate the dual piston design, motor support plate 74 contains a hole to pass a lower rigid tube 82b. The motor 72 is rigidly attached to the motor plate 74. The compliant element of the acoustic network is still provided by hemi-elliptical end caps 84a and 84b. Separation of the hemi-elliptical end caps 84a and 84b and the position of the base plate 74 is fixed by a multiplicity of threaded rods 86 and nuts 88. The threaded rods 86 are rigidly attached to base plate 74. Base plate 74 can be attached to another structure with compliant mounts to reduce the transmission of the vibrations of the thermoacoustic unit to other parts of the larger system. Rigid tube 82b extends upwardly to form rigid tube 82a. The rigid tubes 82a and 82b are connected to the moving portion 73 of the motor 72. Rigid conical pistons 90a and 90b are attached to the rigid tubes 82a and 82b, respectively. Bellows 92a and 92b extend between pistons 90a and 90b and thermally insulated plates 94a and 94b, respectively. Insulating blankets 96a and 96b may be applied to the pistons 90a and 90b, respectively. Cylindrical springs 98a and 98b may be used to increase the mechanical resonant frequency of the system. Alternatively, a single cylindrical spring may be used, or different kinds of resonant frequency adjusting elements may be used. As with the earlier embodiment, an acoustic phasing network, consisting of a thermal buffer tube, flow suppression bellows, and an enclosure with an added mass, may be provided at each end of the device 70.

It should be pointed out that the absence of a pressure containment vessel does not result in the radiation of high sound pressure levels. This is due to the fact that the dual bellows motion has no acoustic monopole component in its radiation pattern and its equivalent dipolar source strength is very small since the separation of the acoustic centers of the bellows is a very small fraction of the wavelength of the radiated sound in air at the typical frequencies of operation.

Third Preferred Embodiment

FIG. 6 shows a cross-sectional side view of a third preferred embodiment of a thermoacoustic device 110 with a compliant enclosure. This device 110 is designed to produce a refrigeration effect by absorbing heat through a unitized cold head heat exchanger 112 and delivering that heat at a lower temperature to a regenerator 114, contained in a thermally-insulated and thermally insulating support or platform 118. The energy in sound waves is used to pump that heat up to a higher temperature at the hot end of the regenerator 114. This heat, plus any acoustic energy deposited by the thermoacoustic heat pumping process, is deposited on hot heat exchanger 116. The heat deposited on hot heat exchanger 116 is exhausted from the system by hot heat exchange transport fluid that passes through the heat exchanger 116.

The components of the thermoacoustic device 110 are preferably housed in a pressure vessel 120. The pressure vessel 120 is formed by a generally cylindrical wall or shell 122 that is closed on its "lower" end by a base plate 124. While illustrated with the motor at the "lower" end, the embodiment of FIG. 6 is preferably operated in an inverted positioned as compared to the illustrated position, but will be described with reference to the illustrated orientation. It can also be oriented in other positions. The upper end of the wall or shell 122 is closed off by the combination of the platform or support 118 and the cold head heat exchanger 112, as will become more clear with respect to the further description of the cold head heat exchanger hereinbelow.

A linear motor 126 is attached to the bottom plate 124 and the moving portion of the linear motor 126 is connected to the main piston or power piston 128 by connecting member 130. A bellows 132 extends between the power piston 128 and the support 118. As the power piston moves upwardly, the working fluid in the compliant enclosure is compressed and as the power piston 128 moves downwardly, the working fluid in the compliant enclosure is decompressed. In this embodiment, a multiplier volume 134 is defined inside the compliant cavity. This multiplier volume 134 is defined by a multiplier cylinder 136 which has an upper end attached to the support 118 and a lower end closed off by a multiplier cone or piston 138. A flexible seal 140 interconnects the cone or piston 138 with the cylinder 136. As the multiplier cone 138 moves upwardly and downwardly, the volume of the multiplier volume, and the pressure of the gas contained therein, is increased and decreased.

The volume of working fluid inside the bellows 132 and outside the multiplier volume 134 may be referred to as the main volume 144. The main volume 144 and the multiplier volume 134 are in fluid communication through the thermal components. That is, a fluid path is defined from the multiplier volume 134, through the hot heat exchanger 116, through the regenerator 114, through the fins 142 of the cold heat exchanger, and through windows 146 in the support 118. Therefore, gas can flow from the main volume 144 through the windows 146, make a U-turn through the fins 142, and enter the regenerator 114. In operation, the multiplier piston 138 and power piston 128 move generally in phase or close to being in phase with one another. Therefore, flow of gas between the multiplier volume 134 and main volume 144 is limited, since a pressure wave converges from both "sides" on the regenerator 114.

The multiplier volume 134 cooperates with the main volume 144 to provide the proper phasing between oscillating pressure in the regenerator and gas flow through the regenerator. Preferably, the pressure and flow are in-phase, or very close to being in-phase with one another. Additional details concerning the components and operation of the embodiment of FIG. 4 are disclosed in U.S. provisional patent application Serial No. 60/445,866, filed Feb. 6, 2003, and a co-pending patent application Ser. No. 10/410,992 entitled "Thermoacoustic Device," filed Apr. 9, 2003, the entire contents of both of which are incorporated herein by reference. This provisional patent application and co-pending patent application disclose additional thermoacoustic device designs which make use of compliant enclosures in accordance with the present invention. These various designs serve as alternative embodiments of the designs disclosed and discussed herein.

Other Alternatives

Flow Suppression Bellows

For the power densities preferred for the present invention, the oscillatory gas flow through the hole in the regenerator 16, heat exchangers 12 and 18, and the thermal buffer tube 44 can be larger than that which can be accommodated by the flow suppression bellows 46 shown in FIG. 2. This flow creates the inertance in the acoustic phasing network that includes the compliance of the gas-filled volume between the hot heat exchanger 16 and the hemi-elliptical end cap 52. An estimate of the required network flow volume $\delta V_{network}$ can be calculated easily from knowledge of the compliance volume $V_{network}$, directly from the adiabatic gas law.

$$\delta V_{network} \cong \frac{V_{network}}{\gamma} \frac{p_1}{p_m} \quad (10)$$

To accommodate that flow while suppressing Gedeon Streaming, a different bellows design, combining a thin bellows and a thin flexural disk, as shown in FIG. 4, might be employed.

Since the differential pressure that would create the Gedeon Streaming, if not suppressed, is relatively small, the thickness of bellows 100 and flexural disk 101 can also be quite small. For the proper bellows convolution shape, such a thin bellows can compress or extend by 50% of its active length $L_{ac}$. Such a thin bellows also provides a flexible boundary condition for the flexure disk that is attached to cylindrical bellows 100. Due to the thinness of the flexural plate, the excursion of the center of flexible plate 101 can be a substantial fraction of its diameter. In this way, the required volumetric flow of the gaseous working fluid can be accommodated and Gedeon Streaming can be suppressed, even if large flow volumes are required to provide the compliance required by the acoustical phasing network.

An alternative to the flow suppression bellows described above is the annular flow suppression bellows shown in FIG. 5. This alternative utilizes two concentric bellows that cover the cold heat exchanger and provide a gas-tight seal that eliminates Gedeon Streaming generated in the regenerator. An inner flow suppression bellows 103 is joined to the inner radius of the cold heat exchanger and an outer flow suppression bellows 104 is joined to the outer radius of the cold heat exchanger. A lid 105 is joined to both the inner flow suppression bellows 103 and the outer flow suppression bellows 104 to provide a gas-tight seal.

The annular flow suppression bellows has the same advantage as the bellows. It can accommodate larger oscillatory flow volumes, $V_{network}$, than flow suppression bellows 46 in FIG. 2. It also localizes the cold gas that leaves cold heat exchanger 14 to the vicinity of the cold heat exchanger, thereby reducing any extraneous heat load imposed on the cold heat exchanger by the warmer gas contained within the bellows. The annular flow suppression bellows also provides a barrier to the warmer gas convected along the surface of the cold heat exchanger, opposite the regenerator, due to Rayleigh Streaming, or other mechanisms.

The extraneous heat load on the cold exchanger can be further reduced by the application of a thermally-insulating layer 106 on either or both surfaces of the lid 105, the inner flow suppression bellows 103, and the outer flow suppression bellows 104. In FIG. 5, the thermally-insulating layer 106 is shown as applied only to the outer surface of the lid 105.

Standing Wave Thermoacoustical Components

Instead of the regenerator approach which uses the acoustic phasing network shown in FIG. 2 and FIG. 3, a standing-wave thermoacoustic "stack" can be substituted for the regenerator 40, and the flow suppression bellows 46 with the added mass 48 and the thermal buffer tube 44 can be eliminated. Substitution of a "stack" for the regenerator 40 will simplify the design while retaining the advantages of a compliant enclosure, but at the probable "expense" of reduced thermal efficiency.

Multi-stage Refrigerator

A multi-stage refrigerator that employs more than two stacks or regenerators can also be designed.

While the invention has been particularly shown and described with reference to preferred embodiments thereof, it will be understood by those skilled in the art that various alterations in form and detail may be made therein without departing from the spirit and/or scope of the invention.

We claim:

1. A thermoacoustic device comprising:
   a compliant enclosure including a rigid portion and a compliant portion, the compliant portion including an oscillating member and a flexure seal with a pair of ends and a flexure body extending therebetween, one of the ends being sealed to the rigid portion and the other end being sealed to the oscillating member, the flexure seal having an average cross sectional area and an end to end equilibrium length, a flexure volume, $V_{flex}$, being defined as the product of the average cross sectional area and the end to end equilibrium length;
   a thermal core disposed in the compliant enclosure, the thermal core including at least a first and a second heat exchanger;
   a working volume, $V_o$, of pressurized gaseous working fluid filling the compliant enclosure, the working volume of gaseous working fluid having equilibrium pressure, $P_m$; and
   a motor operable to oscillate the oscillating member such that the end to end length of the flexure seal is increased and decreased with respect to the equilibrium length, whereby the pressure of the working volume of gaseous working fluid is oscillated between a peak pressure greater than the equilibrium pressure and a minimum pressure less than the equilibrium pressure;
   wherein $V_o \leq 4 * V_{flex}.$ 2. The thermoacoustic device according to claim 1, wherein $V_o \leq 2 * V_{flex}.$ 3. The thermoacoustic device according to claim 1, wherein $V_o \leq 1 * V_{flex}.$ 4. The thermoacoustic device according to claim 1, further comprising;
  a pressure vessel, the compliant enclosure being disposed in the pressure vessel and an additional volume of pressurized gaseous working fluid filling the pressure vessel.

5. The thermoacoustic device according to claim 1, wherein at least a portion of the thermal core is disposed in the flexure volume.

6. The thermoacoustic device according to claim 1, wherein a pressure amplitude, $P_l$ is defined as one half of the difference between the peak pressure and the minimum pressure of the working volume; and $$P_l/P_m \geq 5\%.$$

7. The thermoacoustic device according to claim 6, $$P_l/P_m \geq 10\%.$$

8. The thermoacoustic device according to claim 6, $$P_l/P_m \geq 15\%.$$

9. The thermoacoustic device according to claim 1, wherein the thermal core further comprises a regenerator disposed between the first and second heat exchangers.

10. The thermoacoustic device according to claim 6, further comprising an acoustic phasing means for adjusting the phase of the pressure and velocity of the working fluid in the regenerator such that pressure and velocity are substantially in phase. with each other.

11. A thermoacoustic device comprising:
  a compliant enclosure including a rigid portion and a compliant portion, the compliant portion including an oscillating member and a flexure seal with a pair of ends and a flexure body extending therebetween, one of the ends being sealed to the rigid portion and the other end being sealed to the oscillating member, the flexure seal having an average cross sectional area and an end to end equilibrium length, a flexure volume, $V_{flex}$, being defined as the product of the average cross sectional area and the end to end equilibrium length;
  a thermal core disposed in the compliant enclosure, the thermal core including at least a first and a second heat exchanger;
  a working volume, $V_o$, of pressurized gaseous working fluid filling the compliant enclosure, the working volume of gaseous working fluid having equilibrium pressure; $P_m$; and
  a motor operable to oscillate the oscillating member such that the end to end length of the flexure seal is increased and decreased with respect to the equilibrium length, whereby the pressure of the working volume of gaseous working fluid is oscillated between a peak pressure greater than the equilibrium pressure and a minimum pressure less than the equilibrium pressure;
  wherein at least a portion of the thermal core is disposed in the flexure volume.

12. The thermoacoustic device according to claim 11, further comprising;
  a pressure vessel, the compliant enclosure being disposed in the pressure vessel and an additional volume of pressurized gaseous working fluid filling the pressure vessel.

13. The thermoacoustic device according to claim 11, wherein a pressure amplitude, $P_l$ is defined as one half of the difference between the peak pressure and the minimum pressure of the working volume; and $$P_l/P_m \geq 5\%.$$

14. The thermoacoustic device according to claim 13, $$P_l/P_m \geq 10\%.$$

15. The thermoacoustic device according to claim 13, $$P_l/P_m \geq 15\%.$$

16. The thermoacoustic device according to claim 11, wherein the thermal core further comprises a regenerator disposed between the first and second heat exchangers.

17. The thermoacoustic device according to claim 16, further comprising an acoustic phasing means for adjusting the phase of the pressure and velocity of the working fluid in the regenerator such that pressure and velocity are substantially in phase with each other.

18. A thermoacoustic device comprising:
  a compliant enclosure including a rigid portion and a compliant portion, the compliant portion including an oscillating member and a flexure seal with a pair of ends and a flexure body extending therebetween, one of the ends being sealed to the rigid portion and the other end being sealed to the oscillating member, the flexure seal having an average cross sectional area and an end to end equilibrium length, a flexure volume, $V_{flex}$, being defined as the product of the average cross sectional area and the end to end equilibrium length;
  a thermal core disposed in the compliant enclosure, the thermal core including at least a first and a second heat exchanger;
  a working volume, $V_o$, of pressurized gaseous working fluid filling the compliant enclosure, the working volume of gaseous working fluid having equilibrium pressure; $P_m$; and
  a motor operable to oscillate the oscillating member such that the end to end length of the flexure seal is increased and decreased with respect to the equilibrium length, whereby the pressure of the working volume of gaseous working fluid is oscillated between a peak pressure greater than the equilibrium pressure and a minimum pressure less than the equilibrium pressure; a pressure amplitude, $P_l$ being defined as one half of the difference between the peak pressure and the minimum pressure of the working volume; wherein $$P_l/P_m \geq 5\%.$$

19. The thermoacoustic device according to claim 18, $$P_l/P_m \geq 10\%.$$

20. The thermoacoustic device according to claim 18, $$P_l/P_m \geq 15\%.$$

21. A thermoacoustic device comprising:
  a pressure vessel having an interior volume sealed therein;
  a compliant enclosure disposed in the interior volume of the pressure vessel, the compliant enclosure including a rigid portion and a compliant portion, the compliant portion including an oscillating member with a mass, $m_{osc}$, and an area, $A_{osc}$, and a flexure seal with a pair of ends and a flexure body extending therebetween, one of the ends being sealed to the rigid portion and the other end being sealed to the oscillating member, the flexure seal having an average cross sectional area and an end to end equilibrium length, a flexure volume, $V_{flex}$, being defined as the product of the average cross sectional area and the end to end equilibrium length;

a thermal core disposed in the compliant enclosure, the thermal core including at least a first and a second heat exchanger;

a pressurized gaseous working fluid filling the compliant enclosure and the pressure vessel, the gaseous working fluid having a polytropic coefficient, γ, and an equilibrium pressure, $p_m$, a working volume, $V_o$, defined as the volume of working fluid contained in the compliant enclosure;

a motor operable to oscillate the oscillating member at an operating frequency, f, such that the end to end length of the flexure seal is increased and decreased with respect to the equilibrium length, the motor having a moving portion interconnected with the oscillating member, the moving portion having a mass, $m_{motor}$;

a pressure vessel volume, $V_{motor}$, being defined as the volume of gaseous working fluid in the interior volume of the pressure vessel and exterior to the compliant enclosure and not displaced by the motor;

the oscillatory motion of the oscillating member being resisted by a spring force, k, equal to the sum of a mechanical stiffness, $k_{mech}$, resultant from the flexure seal and a gas stiffness, $k_{gas}$, resultant from the gaseous working fluid, the gas stiffness being defined as $$k_{gas} = \frac{\gamma p_m A_{osc}^2}{V_{eff}} = \gamma p_m A_{osc}^2 \left[\frac{1}{V_o} + \frac{1}{V_{motor}}\right]$$

an optimal operating frequency, $f_{opt}$, being defined as $$f_{opt} = \frac{1}{2\pi}\sqrt{\frac{k_{total}}{m_{total}}} = \frac{1}{2\pi}\sqrt{\frac{k_{gas}+k_{mech}}{m_{osc}+m_{motor}+m_{eff}}}$$

wherein $m_{eff}$ is the effective mass of the moving portion of the flexure seal; and the operating frequency, f, being in the range of $0.8*f_{opt}$ to $1.2*f_{opt}$.

22. The thermoacoustic device according to claim 21, wherein the operating frequency, f, being in the range of $0.9*f_{opt}$ to $1.1*f_{opt}$.

23. The thermoacoustic device according to claim 21, wherein the operating frequency, f, is substantially equal to the optimal frequency, $f_{opt}$.

24. The thermoacoustic device according to claim 21, further comprising a spring member connected to the oscillating member, the mechanical stiffness, $k_{mech}$, being resultant from the flexure seal and the spring member and the effective mass, $m_{eff}$, being the sum of the effective mass of the moving portion of the flexure seal and the effective mass of the moving portion of the spring member.

25. The thermoacoustic device according to claim 21, wherein a working volume, $V_o$, is defined as the volume of working gaseous fluid filling the compliant enclosure; and $V_o \leq 4*V_{flex}$.

26. The thermoacoustic device according to claim 25, wherein $V_o \leq 2*V_{flex}$.

27. The thermoacoustic device according to claim 25, wherein $V_o \leq 1*V_{flex}$.

28. The thermoacoustic device according to claim 25, wherein the oscillation of the oscillating member oscillates the pressure of the working volume of gaseous working fluid in the compliant enclosure between a peak pressure greater than the equilibrium pressure and a minimum pressure less than the equilibrium pressure, a pressure amplitude, $P_l$ being defined as one half of the difference between the peak pressure and the minimum pressure of the working volume; and $P_l/P_m \geq 5\%$.

29. The thermoacoustic device according to claim 28, $P_l/P_m \geq 10\%$.

30. The thermoacoustic device according to claim 28, $P_l/P_m \geq 15\%$.

31. A thermoacoustic device comprising:

a pressure vessel having an interior volume sealed therein, the pressure vessel having a perimeter side wall;

a piston disposed in the interior volume of the pressure vessel, the piston having a perimeter seal that slidably engages the side wall so as to define a working volume, $V_o$, on one side of the piston and a motor volume, $V_{motor}$ on the opposite side of the piston, the piston having a mass, $m_{osc}$, and an area, $A_{osc}$;

a thermal core disposed in the working volume, the thermal core including at least a first and a second heat exchanger;

a pressurized gaseous working fluid filling the working volume and the motor volume, the gaseous working fluid having a polytropic coefficient, γ, and an equilibrium pressure, $P_m$;

a motor disposed in the motor volume, the motor being operable to oscillate the oscillating member at an operating frequency, f, such that the pressure of the gaseous working fluid in the working volume oscillates between a peak pressure greater than the equilibrium pressure and a minimum pressure less than the equilibrium pressure, the motor having a moving portion interconnected with the piston, the moving portion having a mass, $m_{motor}$;

the oscillatory motion of the oscillating member being resisted by a spring force, k, equal to a gas stiffness, $k_{gas}$, resultant from the gaseous working fluid, the gas stiffness being defined as $$k_{gas} = \frac{\gamma p_m A_{osc}^2}{V_{eff}} = \gamma p_m A_{osc}^2 \left[\frac{1}{V_o} + \frac{1}{V_{motor}}\right]$$

an optimal operating frequency, $f_{opt}$, being defined as $$f_{opt} = \frac{1}{2\pi}\sqrt{\frac{k_{total}}{m_{total}}} = \frac{1}{2\pi}\sqrt{\frac{k_{gas}}{m_{osc}+m_{motor}}} \text{ ; and}$$

the operating frequency, f, being in the range of $0.8*f_{opt}$ to $1.2*f_{opt}$.

32. The thermoacoustic device according to claim 31, wherein the operating frequency, f, being in the range of $0.9*f_{opt}$ to $1.1*f_{opt}$.

33. The thermoacoustic device according to claim 31, wherein the operating frequency, f, is substantially equal to the optimal frequency, $f_{opt}$.

34. The thermoacoustic device according to claim 31, further comprising a spring member connected to the oscillating member, the spring force, k, further including a mechanical stiffness, $k_{mech}$, being resultant from the spring member, and the total mass, $m_{total}$, further including an effective mass, $m_{eff}$, equal to the effective mass of the moving portion of the spring member, such that $$f_{opt} = \frac{1}{2\pi}\sqrt{\frac{k_{total}}{m_{total}}} = \frac{1}{2\pi}\sqrt{\frac{k_{gas}+k_{mech}}{m_{osc}+m_{motor}+m_{eff}}}.$$

35. The thermoacoustic device according to claim 31, wherein a pressure amplitude, $P_l$, is defined as one half of the difference between the peak pressure and the minimum pressure of the working volume; and $$P_l/P_m \geq 5\%.$$

36. The thermoacoustic device according to claim 35, $$P_l/P_m \geq 10\%.$$

37. The thermoacoustic device according to claim 35, $$P_l/P_m \geq 15\%.$$

* * * * *

UNITED STATES PATENT AND TRADEMARK OFFICE
CERTIFICATE OF CORRECTION

PATENT NO. : 6,792,764 B2
DATED : September 21, 2004
INVENTOR(S) : Matthew E. Poese et al.

It is certified that error appears in the above-identified patent and that said Letters Patent is hereby corrected as shown below:

Column 6,
Line 28, "imoacoustic" should be -- thermoacoustic --.

Column 16,
Line 46, "$L_{bei} = \delta/4$" should read -- $L_{bel} = \lambda/4$ --.

Column 23,
Line 33, after "enclosure" insert -- disposed in the interior volume of a pressure vessel, the compliant enclosure --.
Line 60, "a pressure vessel, the compliant enclosure being disposed in the pressure vessel and" should be -- wherein --.

Column 24,
Line 22, after "enclosure" insert -- disposed in the interior volume of a pressure vessel, the compliant enclosure --.

Signed and Sealed this

Thirty-first Day of January, 2006

JON W. DUDAS
*Director of the United States Patent and Trademark Office*